United States Patent
DeHon et al.

(10) Patent No.: US 7,342,414 B2
(45) Date of Patent: Mar. 11, 2008

(54) FAST ROUTER AND HARDWARE-ASSISTED FAST ROUTING METHOD

(75) Inventors: André DeHon, Pasadena, CA (US); Randy Huang, El Cerrito, CA (US); John Wawrzynek, Berkeley, CA (US)

(73) Assignees: California Institute of Technology, Pasadena, CA (US); The Regents of the University of California, Oakland, CA (US)

( * ) Notice: Subject to any disclaimer, the term of this patent is extended or adjusted under 35 U.S.C. 154(b) by 1041 days.

(21) Appl. No.: 10/356,710

(22) Filed: Jan. 31, 2003

(65) Prior Publication Data

US 2003/0174723 A1    Sep. 18, 2003

Related U.S. Application Data

(60) Provisional application No. 60/415,170, filed on Sep. 30, 2002, provisional application No. 60/363,977, filed on Mar. 14, 2002, provisional application No. 60/353,345, filed on Feb. 1, 2002.

(51) Int. Cl.
*H01L 25/00* (2006.01)
*H03K 19/177* (2006.01)
*G06F 7/38* (2006.01)

(52) U.S. Cl. .................. 326/41; 326/37; 326/38; 326/39; 326/47; 716/16

(58) Field of Classification Search ............. 326/37–41, 326/47
See application file for complete search history.

(56) References Cited

U.S. PATENT DOCUMENTS

| | | | |
|---|---|---|---|
| 3,654,615 A | 4/1972 | Freitag | 340/172.5 |
| 5,144,563 A | 9/1992 | Date et al. | 364/491 |
| 5,200,908 A | 4/1993 | Date et al. | 716/10 |
| 5,465,218 A | 11/1995 | Handa | 716/8 |
| 5,495,419 A | 2/1996 | Rostoker et al. | 364/468 |
| 5,638,292 A | 6/1997 | Ueda | 716/8 |
| 5,744,979 A * | 4/1998 | Goetting | 326/39 |
| 5,796,625 A | 8/1998 | Scepanovic et al. | 364/491 |
| 5,815,403 A | 9/1998 | Jones et al. | 716/9 |
| 5,824,570 A | 10/1998 | Aoki et al. | 438/128 |
| 5,943,486 A * | 8/1999 | Fukui et al. | 716/9 |
| 6,074,428 A * | 6/2000 | Petler | 716/2 |
| 6,080,204 A | 6/2000 | Mendel | 716/7 |
| 6,150,877 A | 11/2000 | Morikawa | 327/565 |
| 6,155,725 A | 12/2000 | Scepanovic et al. | 716/9 |
| 6,243,851 B1 | 6/2001 | Hwang et al. | 716/10 |
| 6,292,929 B2 | 9/2001 | Scepanovic et al. | 716/14 |

(Continued)

FOREIGN PATENT DOCUMENTS

WO    98/35294    8/1998

OTHER PUBLICATIONS

Chan, P.K., et al., "Acceleration of an FPGA Router," *Proceedings of the IEEE Symposium on FPGAs for Custom Computing Machines*, IEEE, pp. 175-181 (Apr. 1997).

(Continued)

*Primary Examiner*—Rexford Barnie
*Assistant Examiner*—Dylan White
(74) *Attorney, Agent, or Firm*—Ladas & Parry, LLP

(57) ABSTRACT

A fast router and a fast hardware-assisted routing method are disclosed in a network having endpoints, switches and interconnect links. The switches are programmable to allow endpoints to be connected through a particular configuration of switches. The switches also comprise: propagation circuitry which allows a search signal to be propagated through the network; allocation circuitry to set the configuration of switches once a path has been found; and deallocation circuitry to clear a configuration of switches once no path has been found.

53 Claims, 24 Drawing Sheets

U.S. PATENT DOCUMENTS

| | | | |
|---|---|---|---|
| 6,323,678 B1* | 11/2001 | Azegami | 326/39 |
| 6,330,707 B1* | 12/2001 | Shinomiya et al. | 716/14 |
| 6,405,299 B1* | 6/2002 | Vorbach et al. | 712/11 |
| 6,683,872 B1 | 1/2004 | Saito et al. | 370/380 |
| 6,687,893 B2* | 2/2004 | Teig et al. | 716/14 |
| 6,961,782 B1 | 11/2005 | Denneau et al. | 709/241 |
| 7,010,667 B2* | 3/2006 | Vorbach et al. | 712/10 |
| 7,171,635 B2* | 1/2007 | Teig et al. | 716/3 |
| 2003/0066043 A1* | 4/2003 | Teig et al. | 716/13 |
| 2004/0139413 A1 | 7/2004 | DeHon et al. | 716/9 |
| 2005/0035783 A1 | 2/2005 | Wang | 326/39 |
| 2005/0063373 A1 | 3/2005 | DeHon et al. | 370/380 |
| 2006/0087342 A1 | 4/2006 | Ayodhyawasi et al. | 326/41 |
| 2007/0067750 A1 | 3/2007 | Amit et al. | 713/13 |

OTHER PUBLICATIONS

Chan, P.K., et al., "New Parallelization and Convergence Results for NC: A Negotiation-Based FPGA Router," *Proceedings of the 2000 International Symposium on Field-Programmable Gate Arrays (FPGA '00), ACM/SIGDA*, pp. 165-174 (Feb. 2000).

DeHon, A., "Entropy, Counting and Programmable Interconnect," *FPGA '96, ACM-SIGDA Fourth International Symposium on FPGAs*, Monterrey CA, Fig. 2, (Feb. 11-13, 1996).

DeHon, A., "Rent's Rule Based Switching Requirements, System Level Interconnect Prediction," *SLIP 2001*, pp. 197-204 (Mar. 31-Apr. 1, 2001).

Henry, D.S., et al., "Cyclic Segmented Parallel Prefix," *Ultrascalar Memo 1*, Yale (Nov. 1998).

Iosupovici, A., "A Class of Array Architectures for Hardware Grid Routers," *IEEE Transactions on Computer-Aided Design of Integrated Circuits and Systems*, vol. CAD-5, No. 2, pp. 245-255 (Apr. 1986).

Landman, B.S., et al., "On Pin Versus Block Relationship for Partitions of Logic Graphs," *IEEE Transactions on Computers*, vol. C-20, No. 12, pp. 1469-1479 (1971), month n/a.

Leiserson, C.E., "Fat Trees: Universal Networks for Hardware-Efficient Supercomputing," *IEEE Transactions on Computers*, vol. C-34, No. 10, pp. 892-901 (Oct. 1985).

McMurchie, L., et al., "PathFinder: A Negotiation-Based Performance-Driven Router for FPGAs," *Proceedings of the ACM/SIGDA International Symposium on Field-Programmable Gate Arrays, ACM*, pp. 111-117 (Feb. 1995).

Ryan, T., et al., "An ISMA Lee Router Accelerator," *IEEE Design and Test of Computers*, pp. 38-45 (Oct. 1987).

Swartz, J.S., et al., "A Fast Routability-Driven Router for FPGAs," *Proceedings of the 1998 International Symposium on Field-Programmable Gate Arrays (FPGA '98)*, pp. 140-149 (Feb. 1998).

Tessier, R., "Negotiated A* Routing for FPGAs," *Proceedings of the 5th Canadian Workshop on Field Programmable Devices*, (Jun. 1998).

Tsu, W., et al., "HSRA: High-Speed, Hierarchical Synchronous Reconfigurable Array," *Proceedings of the International Symposium on Field Programmable Gate Arrays*, pp. 1-10 (Feb. 1999).

"SS7 Tutorial," *Performance Technologies*, INTERNET: <http://www.pt.com/tutorials/ss7>, pp. 1-23 (Aug. 22, 2001).

Chong, F., et al., "METRO: A Router Architecture for High-Performance, Short-Haul Routing Networks," *Proceedings of the Annual International Symposium on Computer Architecture, Chicago, IEEE*, vol. SYMP. 21, pp. 266-277 (Apr. 18-21, 1994).

Alfke, P., "Efficient Shift Registers, LFSR Counters, and Long Psuedo-Random Sequence Generators," *Xilinx Application Note*, XAPP 052, INTERNET: <http://www.xilinx.com/xapp203.pdf> pp. 1-6 (Jul. 7, 1996).

Arora, S., et al., "On-Line Algorithms For Path Selection In a Nonblocking Network," *SIAM Journal on Computing*, vol. 25, No. 3, pp. 1-25 (Jun. 1996).

Banerjee, P., et al., "A Parallel Simulated Annealing Algorithm for Standard Cell Placement on a Hypercube Computer," *IEEE International Conference on Computer-Aided Design*, pp. 34-37 (1986).

Banerjee, P., et al., "Parallel Simulated Annealing Algorithms for Cell Placement on Hypercube Multiprocessors," *IEEE Transactions on Parallel and Distributed Systems*, vol. 1, No. 1, pp. 91-106 (1990).

Banerjee, P., *Parallel Algorithms for VLSI Computer-Aided Design*, Chapter 3, Englewood Cliffs, New Jersey: PTR Prentice Hall, pp. 118-171 (1994).

Betz, V., et al., *Architecture and CAD for Deep-Submicron FPGAs*, Boston: Kluwer Academic Publishers, pp. 50-61 (1999), month n/a.

Bhatt, S.N., et al., "A Framework for Solving VLSI Graph Layout Problems," *Journal of Computer and System Sciences*, vol. 28, pp. 300-345 (1984), month n/a.

Brelet, J., "An Overview of Multiple CAM Designs in Virtex Family Devices," *Xilinx Application Note*, XAPP201, INTERNET: <http://www.xilinx.com/xapp/xapp260.pdf> pp. 1-6 (Sep. 23, 1999).

Brelet, J., et al., "Designing Flexible, Fast CAMs with Virtex Family FPGAs," *Xilinx Application Note*, XAPP03, INTERNET: <http://www.xilinx.com/xapp/xapp203.pdf> pp. 1-17, (Sep. 23, 1999).

Caspi, E., et al., "Stream Computations Organized for Reconfigurable Execution (SCORE): Introduction and Tutorial," *presented at the Tenth International Conference on Field Programmable Logic and Applications*, Villach, Austria, INTERNET: <http://www.cs.berkeley.edu/projects/brass/documents/score_tutorial.html> 31 pages total (Aug. 25, 2000).

Chan, Pak K., et al., "Parallel Placement for Field-Programmable Gate Arrays," *presented at the Eleventh ACM International Symposium on Field-Programmable Gate Arrays*, Monterey, California, INTERNET: <http://www.doi.acm.org/10.1145/103724.103725> pp. 43-50 (2003), month n/a.

Chyan, Dah-Jun, et al., "A Placement Algorithm for Array Processors," *presented at the ACM/IEEE Design Automation Conference*, Miami Beach, Florida, INTERNET: <http://portal.acm.org/citation.cfm?id=800661> pp. 182-188 (1983), month n/a.

Compton, K., et al., "Reconfigurable Computing: A Survey of Systems and Software," *ACM Computing Surveys (CSUR)*, vol. 34, No. 2, INTERNET: <http://doi.acm.org/10.1145/508352.50353> pp. 171-210 (Jun. 2002).

Dally, W.J., "Express Cubes: Improving the Performance of k-ary n-cube Interconnection Networks," *IEEE Transactions on Computers*, vol. 40, No. 9, pp. 1016-1023 (Sep. 1991).

DeHon, A., "Balancing Interconnect and Computation in a Reconfigurable Computing Array (or why you don't really want 100% LUT utilization)," *Proceedings of the 1999 ACM/SGDA Seventh International Symposium on Field Programmable Gate Arrays*, pp. 1-10 (Feb. 21-23, 1999).

DeHon, A., "Compact, Multilayer Layout for Butterfly Fat-Tree," *Proceedings of the Twelfth ACM Symposium on Parallel Algorithms and Architectures*, 10 pages total (Jul. 2000).

DeHon, A., et al., "Hardware-Assisted Fast Routing," *IEEE Symposium on Field-Programmable Custom Computing Machines*, Napa Valley, California, INTERNET: <http:www.cs.caltech.edu/research/ic/abstracts/fastrouts_feem2002.html> pp. 1-11 (Apr. 22-24, 2002).

Erényi, I., et al., "FPGA-based Fine Grain Processor Array Design Considerations," *Proceedings of the Third IEEE International Conference*, pp. 659-662 (1996), month n/a.

Fiduccia, C.M., et al., "A Linear-Time Heuristic for Improving Network Partitions," *19th Design Automation Conference*, pp. 175-181 (1982).

Goto, S., "An Efficient Algorithm for the Two-Dimensional Placement Problem in Electrical Circuit Design," *IEEE Transactions on Circuits and Systems*, vol. CAS-28, No. 1, pp. 12-18 (Jan. 1981).

Greenberg, R.I., et al., "A Compact Layout for the Three-Dimensional Tree of Meshes," *Appl. Math. Lett.*, vol. 1, No. 2, pp. 171-176 (1988), month n/a.

Greenberg, R.I., et al., "Randomized Routing on Fat-Trees," *Laboratory for Computer Science, Massachusetts Institute of Technology*, Cambridge, Massachusetts, pp. 1-23 (Jun. 13, 1996).

Haldar, M., et al., "Parallel Algorithms for FPGA Placement," *Proceedings of the Tenth Great Lakes Symposium on VLSI*, INTERNET: <http://doi.acm.org/10.1145/330855.330988> pp. 86-94 (2000), month n/a.

Horvath, E.I., "A Parallel Force Direct Based VLSI Standard Cell Placement Algorithm," *Proceedings of the International Symposium on Circuits and Systems*, vol. 2, pp. 2071-2074 (1993), month n/a.

Huang, R., et al., "Stochastic, Spatial Routing for Hypergraphs, Trees, and Meshes," *Eleventh ACM International Symposium on Field-Programmable Gate Arrays*, INTERNET: <http://www.cs.caltech.edu/research/ic/abstracts/fastroute_fpga2003.html> 12 pages total (Feb. 23-25, 2003).

Kernighan, B.W., et al., "An Efficient Heuristic Procedure for Partitioning Graphs," *Bell Syst. Tech. J.*, vol. 49, No. 2, pp. 76-80 (Feb. 1970).

Kirkpatrick, S., et al., "Optimization by Stimulated Annealing," *Science*, vol. 220, No. 4598, pp. 671-680 (May 13, 1983).

Kravitz, S.A., et al., "Multiprocessor-Based Placement by Stimulated Annealing," *presented at the Twenty-Third IEEE Design Automation Conference*, Las Vegas, Nevada INTERNET: <http://doi.acm.org/10.1145/318013.318104> pp. 567-573 (1986), month n/a.

"METIS: Family of Multilevel Partitioning Algorithms," INTERNET: <http://www.users.cs.umn.edu/~karypis/metis/index.html> 1 page total (Retrieved on Feb. 4, 2005).

Mulpuri, C., et al., "Runtime and Quality Tradeoffs in FPGA Placement and Routing," *Proceedings of the Ninth International Symposium on Field-Programmable Gate Arrays*, INTERNET: <http://www.ee.washington.edu/faculty/hauck/publications/RuntimeTradeoffs.pdf> pp. 29-36 (Feb. 11-13, 2001).

Sai-Halasz, G.A., "Performance Trends in High-End Processors," Proceedings of the IEEE, vol. 83, No. 1, pp. 20-36 (Jan. 1995).

Sankar, Y., et al., "Trading quality for Compile Time: Ultra-Fast Placement for FPGAs," *Proceedings of the 1999 ACM/SIGDA Seventh International Symposium on Field Programmable Gate Arrays*, INTERNET: <http://www.eecg.toronto.edu/~jayar/pubs/sankar/fpga99sankar.pdf> pp. 157-166 (1999), month n/a.

Schnorr, C.P., et al., "An Optimal Sorting Algorithm For Mesh Connected Computers," *presented at the Eighteenth Annual ACM Symposium on Theory of Computing*, Berkeley, CA, INTERNET: <http://doi.acm.org/10.1145/359461.359481> pp. 255-270 (1986), month n/a.

Shahookar, K., et al., "VSLI Cell Placement Techniques," *ACM Computing Surveys (CSUR)*, vol. 23, No. 2, pp. 143-220 (Jun. 1991).

Spira, P., et al., "Hardware Acceleration of Gate Array Layout," *presented at the 22nd ACM/IEEE Design Automation Conference*, Las Vegas, Nevada, INTERNET: <http://doi.acm.org/10.1145/317825.317913> pp. 359-366 (1985), month n/a.

Tessier, R., "Fast Placement Approaches for FPGAs," *ACM Transactions on Design Automation of Electronic Systems (TODAES)*, vol. 7, No. 2, pp. 284-305 (Apr. 2002).

Tessier, R., "Negotiated A* Routing for FPGAs," *Proceedings of the 5th Canadian Workshop on Field Programmable Devices*, 6 pages total (Jun. 1998).

Thompson, C.D., "Area-Time Complexity for VLSI," *Eleventh Annual ACM Symposium on Theory of Computing*, pp. 81-88 (May 1979).

Thompson, C.D., et al., "Sorting on a Mesh-Connected Parallel Computer," *Communications of the ACM*, vol. 20, No. 4, pp. 263-271 (Apr. 1977).

Togawa, N., et al., "An Incremental Placement and Global Routing Algorithm for Field-Programmable Gate Arrays," *Design Automation Conference*, pp. 519-526 (1998), month n/a.

Togawa, N., et al., "Maple: A Simultaneous Technology Mapping, Placement, and Global Routing Algorithm for Field-Programmable Gate Arrays," *IEEE/ACM International Conference on Computer-Aided Design*, pp. 156-163 (1994), month n/a.

Wu, Yu-Liang, et al., "Graph-Based Analysis of 2-D FPGA Routing," *IEEE Transactions on Computer-Aided Design of Integrated Circuits and Systems*, vol. 15, No. 1, pp. 33-44 (Jan. 1996).

* cited by examiner

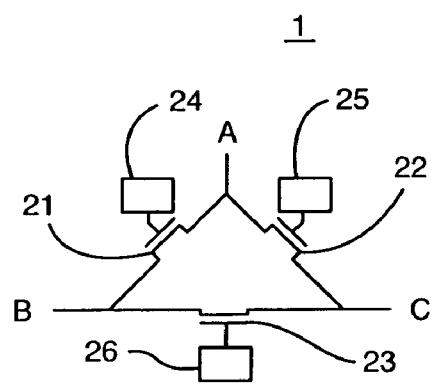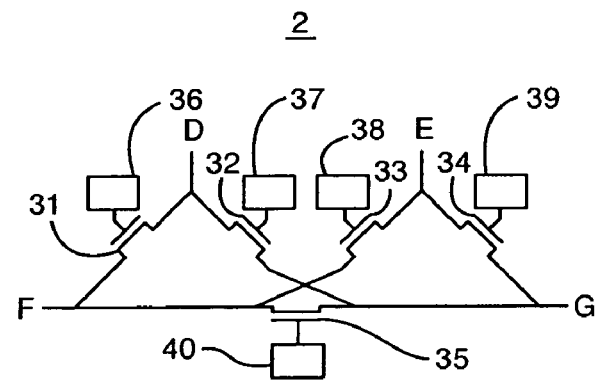
PRIOR ART
FIG. 2
PRIOR ART
FIG. 3

| SWITCH # | NET # | CROSSOVER SWITCHBOX # | LEFT CHILD SWITCH # | RIGHTCHILD SWITCH # |
|---|---|---|---|---|
| . . . | . . . | . . . | . . . | . . . |
| . . . | . . . | . . . | . . . | . . . |
| | | | | |

153 — NET #
154 — CROSSOVER SWITCHBOX #
151 — LEFT CHILD SWITCH #
152 — RIGHTCHILD SWITCH #

FIG. 16

$$\text{VictimLatch} = ((\text{Parent}_{in}\ \text{IdentifyVictim}\ (CL + CR)) + )\text{Parent}_{in}\ \text{DropBit})) \cdot \overline{\text{ClearVictim}}$$

$$\text{ConfigClear} = \text{Drop VictimLatch}$$

$$CL = \text{Global Route}_{Left}\ \text{Allocate Parent}_{in}\ \overline{\text{ConfigClear}}$$

$$CR = \text{Global Route}_{Right}\ \text{Allocate Parent}_{in}\ \overline{\text{ConfigClear}}$$

$$CA = \text{AllocateThisPath Allocate}$$

$$\text{Switch}_{Left} = CL + (\text{IdentifyVictim Global Route}_{Left})$$

$$\text{Switch}_{Right} = CR + (\text{IdentifyVictim Global Route}_{Right})$$

$$\text{Switch}_{Across} = CA$$

$$\text{Occupied} = CA + CR + CL$$

$$\text{Delay} = \overline{\text{Occupied}\ ((\text{Left}_{in} \cdot CL) + (\text{Right}_{in} \cdot CR))}$$

$$\text{LeftOrRight} = \text{Left}_{in} + \text{Right}_{in}$$

$$\text{eftOrRightFF} = \text{LeftOrRight}$$

$$\text{LockFF} = \text{Lock Parent}_{out}$$

$$\text{Search} = \overline{\text{LockFF}}\ (\text{Delay LeftorRightFF} + \overline{\text{Delay}}\ \text{LeftOrRight})$$

$$\text{Left}_{out} = \text{AllocateThisPath} + (\text{Switch}_{Across}\ \text{Right}_{in}) + (\text{Switch}_{Left}\ \text{Parent}_{in})$$

$$\text{Right}_{out} = \text{AllocateThisPath} + (\text{Switch}_{Across}\ \text{Left}_{in}) + (\text{Switch}_{Right}\ \text{Parent}_{in})$$

$$\text{Parent}_{out} = (\text{VictimSearch VictimLatch}) + \text{Search} + (\text{Switch}_{Left}\ \text{Left}_{in}) + (\text{Switch}_{Right}\ \text{Right}_{in})$$

$$\text{FanoutFF} = \text{Allocate}\ (\text{AllocateThisPath} + \text{Parent}_{in})\ \overline{\text{NewNet}}$$

$$\text{ValidPath} = (\text{Left}_{in}\ \text{Right}_{in}) + (\text{FanoutFF}\ ((\text{Left}_{in}\ \text{GlobalRoute}_{Left}) + (\text{Right}_{in}\ \text{GlobalRoute}_{Right}))$$

$$\text{VictimPath} = \text{Left}_{in} + \text{Right}_{in}$$

FIG. 25

$$\text{AnyIn} = N_{in} + E_{in} + S_{in} + W_{in}$$

$$\text{AnyAlloc} = NS_{alloc} + NE_{alloc} + NW_{alloc} + SE_{alloc} + SW_{alloc} + EW_{alloc}$$

$$N_{out\_calc} = \text{Search}\ \overline{N_{in}}\ \overline{N_{uon}}\ (S_{in}\ \overline{S_{uon}} + W_{in}\ \overline{W_{uon}} + E_{in}\ \overline{E_{uon}})\ \overline{\text{Prefer}[2:0] = N}$$
$$+ \text{Allocate AnyIn}\ (\text{Prefer}[2:0] = N)$$
$$+ \text{IdentifyVictim}\ (NS_{victim} + NW_{victim} + NE_{victim})$$
$$+ (\text{Search} + \text{Sensitize Path})\ (E_{in}\ NE_{atn} + S_{in}\ NS_{atn} + W_{in}\ NW_{atn})\ \overline{\text{Prefer}[2:0] = N}$$
$$+ N_{out\_congest}\ \text{SensitizePath}\ \overline{\text{Prefer}[2:0] = N}$$

$$N_{out\_congest} = \text{Search}\ (E_{in} + S_{in} + W_{in})$$

$$N_{out} = \text{SearchBegin}\ N_{out\_calc} + \overline{\text{SearchBegin}}\ N_{out}$$

$$NS = (\text{Install}\ NS_{alloc} + NS)\ \overline{(\text{Clear} + \text{Install}\ NS_{victim}\ \overline{NS_{alloc}})}$$

$$NS_{atn} = \overline{\text{SearchNetBegin}}\ (NS_{atn} + NS_{alloc}\ \text{Install})$$

$$N_{uon} = NS\ \overline{NS_{atn}} + NE\ \overline{NE_{atn}} + NW\ \overline{NW_{atn}}$$

$$NS_{alloc} = \text{Allocate}\ (N_{in}\ (\text{Prefer}[2:0] == S) + S_{in}\ (\text{Prefer}[2:0] == N)) + \overline{\text{SearchBegin}}\ NS_{alloc}$$

$$NS_{victim} = \overline{\text{SearchBegin}}\ NS\ \overline{NS_{atn}}\ (\text{AnyAlloc}\ \overline{EW_{alloc}} + \text{IdentifyVictim}\ (N_{in} + S_{in}))$$
$$+ \overline{\text{SearchBegin}}\ NS_{victim}$$

FIG. 26

FAST ROUTER AND HARDWARE-ASSISTED FAST ROUTING METHOD

CROSS REFERENCE TO RELATED APPLICATIONS

This application claims the benefit of U.S. provisional Patent Application Ser. No. 60/353,345, filed Feb. 1, 2002 for a "Hardware-Assisted Fast Routing" by André DeHon, Randy Huang, John C. Wawrzynek, U.S. provisional Patent Application Ser. No. 60/363,977 filed Mar. 14, 2002 for "Implementation of Computation Note 10: FPGA-accelerated Fast-Routing for Mesh Topologies" by André DeHon, Randy Huang, John C. Wawrzynek, and U.S. provisional Patent Application Ser. No. 60/415,170 filed Sep. 30, 2002 for "Stochastic, Spatial Routing for Hypergraphs, Trees, and Meshes" by André DeHon, Randy Huang, John C. Wawrzynek, the disclosure of all of which is incorporated herein by reference.

STATEMENT REGARDING FEDERALLY SPONSORED RESEARCH OR DEVELOPMENT

The present invention was made with support from the United States Government under Grant number N00014-01-0651 awarded by the Office of Naval Research of the Department of the Navy. The United States Government has certain rights in the invention.

BACKGROUND OF THE INVENTION

1. Field of the Invention

The present invention relates to devices or systems where the interconnect (wiring, communication) structure is defined after fabrication and interconnect patterns persist for long times such as Field-Programmable-Gate-Arrays (FPGAs) and coarse-grained reconfigurable devices. Specifically, the present invention addresses how to accelerate the discovery of high-quality routes on these devices or systems, by disclosing a router and a hardware-assisted fast routing method.

2. Description of the Prior Art

FIGS. 1 to 3 schematically describe a programmable network which has been generally discussed in C. E. Leiserson, Fat Trees: Universal Networks for Hardware Efficient Supercomputing, IEEE Transactions on Computers, C-34 (10):892-901, October 1985 and further expanded in William Tsu, Kip Macy, Atul Joshi, Randy Huang, Norman Walker, Tony Tung, Omid Rowhani, Varghese George, John Wawrzynek, and André DeHon, "HSRA: High-Speed, Hierarchical Synchronous Reconfigurable Array," in Proceedings of the International Symposium on Field Programmable Gate Arrays, February 1999, pp. 125-134.

With reference to FIG. 1, the programmable network comprises an array of interconnects having a first set of switches or switchpoints 1 and a second set of switches or switchpoints 2. The switches of the first set are usually T-switches, and the switches of the second set are usually π-switches, as later described in FIGS. 2 and 3. The HSRA also comprises a third set of switches 3, the connection-box switches, and a plurality of network endpoints 4.

The network endpoints 4 can be, for example, lookup tables (LUTs) or processors. In the example shown in the Figure, each endpoint is connected to seven connection-box switches 3. A connection-box switch is a matrix of switching transistors (like the ones shown in the following FIGS. 2 and 3) each of which is able to connect, based on the status of a control bit, a vertical connection (e.g. a connection into the hierarchical network) with a horizontal connection (a connection into the endpoint). The connection-box matrix may be partially populated (as shown). See, for example, André DeHon, Entropy, Counting and Programmable Interconnect, FPGA '96, ACM-SIGDA Fourth International Symposium on FPGAs, Feb. 11-13, 1996, Monterey Calif., FIG. 2.

A first feature of the HSRA network is that the number of switches in each hierarchical switchbox is linear in the number of wires in the switchbox and the total number of switches 1, 2, 3 in the network is linear in the number of endpoints 4. See, for example, hierarchical switchboxes 5, 6, and 7 of FIG. 1.

A further feature of the HSRA network is that there is a unique set of switchboxes between any source endpoint and sink endpoint of the network, so that global routing (identification of a set of switchboxes from a source to a sink) is trivial. However, detail routing, i.e. identification of the precise set of switches from source to sink, is not trivial.

FIG. 2 shows an embodiment of a switch identified by the numeral 1 in FIG. 1. The switch 1 of FIG. 2 is called T-switch (three-side switch) and comprises switching transistors 21, 22, and 23 having respective configuration bit control inputs 24, 25, and 26. The switching transistors allow a connection to be made between any two of the three sides A, B, and C, where side A is usually called the "parent" and sides B and C are usually called the "children", or even to make a connection between all three sides. For example, if bit control inputs 24 and 26 are set to 1, and input 25 is set to 0, the parent A is connected to the child B and the child B is connected to the child C, but the parent A is not directly connected with the child C.

FIG. 3 shows an embodiment of a switch identified by the numeral 2 in FIG. 1. The switch 2 of FIG. 3 is called π-switch (four-side switch) and comprises switching transistors 31, 32, 33, 34, and 35 having respective configuration bit control inputs 36, 27, 38, 39, and 40. A π-switch allows, for example, side F or side G to be connected to sides D and/or E, according to the status of the control inputs.

Switches with more than two children links and/or more than two parent links are also known. See, for example, Andre DeHon, Rent's Rule Based Switching Requirements, System-Level Interconnect Prediction, SLIP 2001, Mar. 31-Apr. 1, 2001, pp. 197-204.

The current dominant approach to HSRA detail routing is a software approach based on a routine known as PathFinder. See, for example, Larry McMurchie and Carl Ebeling, "PathFinder: A Negotiation-Based Performance-Driven Router for FPGAs," in Proceedings of the ACM/SIGDA International Symposium on Field-Programmable Gate Arrays, ACM, February 1995, pp. 111-117. Further approaches provide for the presence of multiple processors, where parallel software implementation of PathFinder is provided. See Pak K. Chan and Martine D. F. Schlag, "Acceleration of an FPGA Router," in Proceedings of the IEEE Symposium on FPGAs for Custom Computing Machines, IEEE, April 1997, pp. 175-181, and Pak K. Chan and Martine D. F. Schlag, "New parallelization and convergence results for nc: A negotiation-based FPGA router," in Proceedings of the 2000 International Symposium on Field-Programmable Gate Arrays (FPGA '00), ACM/SIGDA, February 2000, pp. 165-174.

With reference to more traditional, mesh-based FPGA routing networks, several attempts have been made to improve the performance of software-based FPGA routers, as shown in J. S. Swarz, V. Betz, and J. Rose, A Fast Routability-Driven Router for FPGAs, Proceedings of the 1998 International Symposium on Field-Programmable Gate Arrays (FPGA '98), pp. 140-149, ACM/SIGDA, February 1998 and in R. Tessier, Negotiated A* Routing for FPGAs, Proceedings of the 5th Canadian Workshop on Field Programmable Devices, June 1998.

A major problem with these entirely software-based approaches is that billions of software cycles are usually required, which are not sufficient to make runtime routing viable in circumstances where, for example, (1) the specific computing task is not known or defined until runtime, (2) the task may be used for only a few million cycles, or (3) the task must be operational in seconds (or less) instead of minutes or hours.

Hardware-based approaches are also known, as disclosed, for example, in A. Iosupovici, A class of Array Architectures for Hardware Grid Routers, IEEE transactions on Computer-Aided Design of Integrated Circuits and Systems, 5(2):245-255, April 1986 and in T. Ryan and E. Rogers, An ISMA Lee Router Accelerator, IEEE Design and Test of Computers, pp. 38-45, October 1987.

Therefore, there is a need for a method and a device which makes runtime routing more viable than currently known, in order to substantially reduce the time to find a quality set of routes.

SUMMARY OF THE INVENTION

The present invention improves the prior art results by using a novel routing device and hardware-assisted searching method. According to such method, the time for the search task can be significantly reduced over the software version. In particular, according to the present invention, the network structure itself will be used to support a parallel route search and keep track of the state of the network. By adding a few gates to the switchpoints (roughly 20 gates per switch), the present invention is able to perform a free or least-cost path search in parallel, completing the search in just tens of cycles.

According to a first aspect, a network is provided, comprising: a plurality of endpoints connectable through interconnect links; and a plurality of switchpoints to programmably connect one or more of the interconnect links, a path between endpoints being determined by a configuration of switchpoints, wherein the switchpoints comprise propagation circuitry to propagate a search signal through the network, to identify the configuration of switchpoints allowing a path between a first endpoint and a second endpoint to be established.

According to a second aspect, a network is provided, comprising: a plurality of endpoints connectable through interconnects; and a plurality of programmable switchpoints to connect one or more of the interconnects, wherein the switchpoints and the interconnects act as: search circuitry during a search phase where a search signal is propagated through the network to identify a configuration of switchpoints establishing a path between a first endpoint and at least one second endpoint; allocation circuitry during an allocation phase where the switchpoints of the configuration of switchpoints establishing the path are set; victimization circuitry during a deallocation phase where set switchpoints are cleared; and path-establishing circuitry during normal operation of the network.

According to a third aspect, a hardware-assisted method is provided, to route a signal between a first endpoint and a second endpoint on a network having connections and switchpoints, the method comprising: determining unused network connections; and driving a search signal into the network to identify a configuration of switchpoints allowing a path between the first endpoint and the second endpoint to be established.

According to a fourth aspect, a network is provided comprising: a plurality of endpoints connectable through interconnects; and a plurality of switching elements to programmably connect one or more of the interconnects, a path between endpoints being determined by a configuration of switching elements, wherein the switching elements comprise propagation hardware to propagate a search signal through the network, in order to identify the configuration of switching elements allowing a path between one endpoint and a plurality of other endpoints to be established.

According to a fifth aspect, a method is provided for searching a path, in a network having a plurality of switchpoints, between a source and a plurality of destinations, the method comprising, for each destination: propagating a search signal from the destination along unused network connections to identify path-establishing switchpoints establishing a path between the source and the destination; and allocating the established path by setting the path-establishing switchpoints.

According to a sixth aspect, a method is provided for establishing a route between a source and at least a destination on a programmable routing network having a plurality of switchpoints, comprising: in a first time step, starting a route search by driving a search signal from the source along unused network connections originating from the source; upon reaching of a switchpoint, in a second time step, propagating the search signal along unused network connections originating from the switchpoint; in case the search signal reaches the switchpoint from more than one direction, determining a preferred direction of propagation of the search signal originating from the switchpoint; and terminating the route search when the search signal reaches the at least one destination.

According to a seventh aspect, a method is provided for establishing a route between a source and at least one destination on a programmable routing network having a plurality of switchpoints, comprising: starting a route search by driving a search signal from the source to a first switchpoint; propagating the search signal from the first switchpoint to other switchpoints; and terminating the route search when the signal reaches the at least one destination.

According to an eight aspect, a switch is provided to be used in a network according to the present invention, the switch comprising propagation circuitry to propagate a search signal through the network.

The feature of the unique set of switchboxes between source and sink introduced with reference to FIG. 1 above also means that there is a unique "least common ancestor", also called "crossover" switchbox between any source and sink. With reference to the network of FIG. 1, each switchbox is a crossover switchbox for some set of source/sink pairs.

In the path search step according to the present invention, paths are traced in parallel from the source and sink to the crossover switchbox. If the search from the source and the search from the sink meet on one (or more) wires at the crossover switchbox, one or more viable route paths have been found.

A single path associated with a determined source-sink pair may also be allocated, meaning with this that the switches encountered across a single path are then set to connect the path. The allocation step according to the present invention can be either hardware-based or software-based. In case no path is found between a determined source and a determined sink, the present invention also provides for deallocation of some of the already allocated paths to create an available path. The deallocation step will be also referred to as 'victimization' step throughout the present specification. Also the deallocation/victimization step can be either hardware-based or software-based.

Therefore, the present invention provides a device and a method capable of self-routing by means of a limited amount of additional hardware added to the network. Quality route search negotiation is performed, and techniques for selecting among many possible paths and negotiating congestions are provided. High quality routes are achieved while parallelizing the route search, by using the existing interconnect and configuration of a configurable network to support fast route search and negotiation. Once identified, the routes are able to be installed directly into the device. Routes can also be victimized and replaced by new routes. The victimized routes can be identified and reported to a central or hierarchical controller. Congested routes are identified with a minimum amount of hardware and, in the general case, routes with the minimum number of occupying nets are identified.

It should be noted that the present invention can also be useful for Programmable-System-on-a-Chip devices and networks of processors.

BRIEF DESCRIPTION OF THE DRAWINGS

The present invention will be understood and appreciated more fully from the following detailed description taken in conjunction with the drawings in which:

FIG. 2, already described above, shows a T-switch for use with an HSRA network;

FIG. 3 already described above, shows a T-switch for use with an HSRA network;

FIG. 16 shows an example of a table used in software allocation and victimization;

FIG. 25 shows the logic equations needed to implement a tree switch that supports hardware-assisted routing of FIGS. 19-24; and FIG. 26 shows a representative set of equations for the diamond switchpoint.

DETAILED DESCRIPTION OF THE INVENTION

Overview

Figure 1:
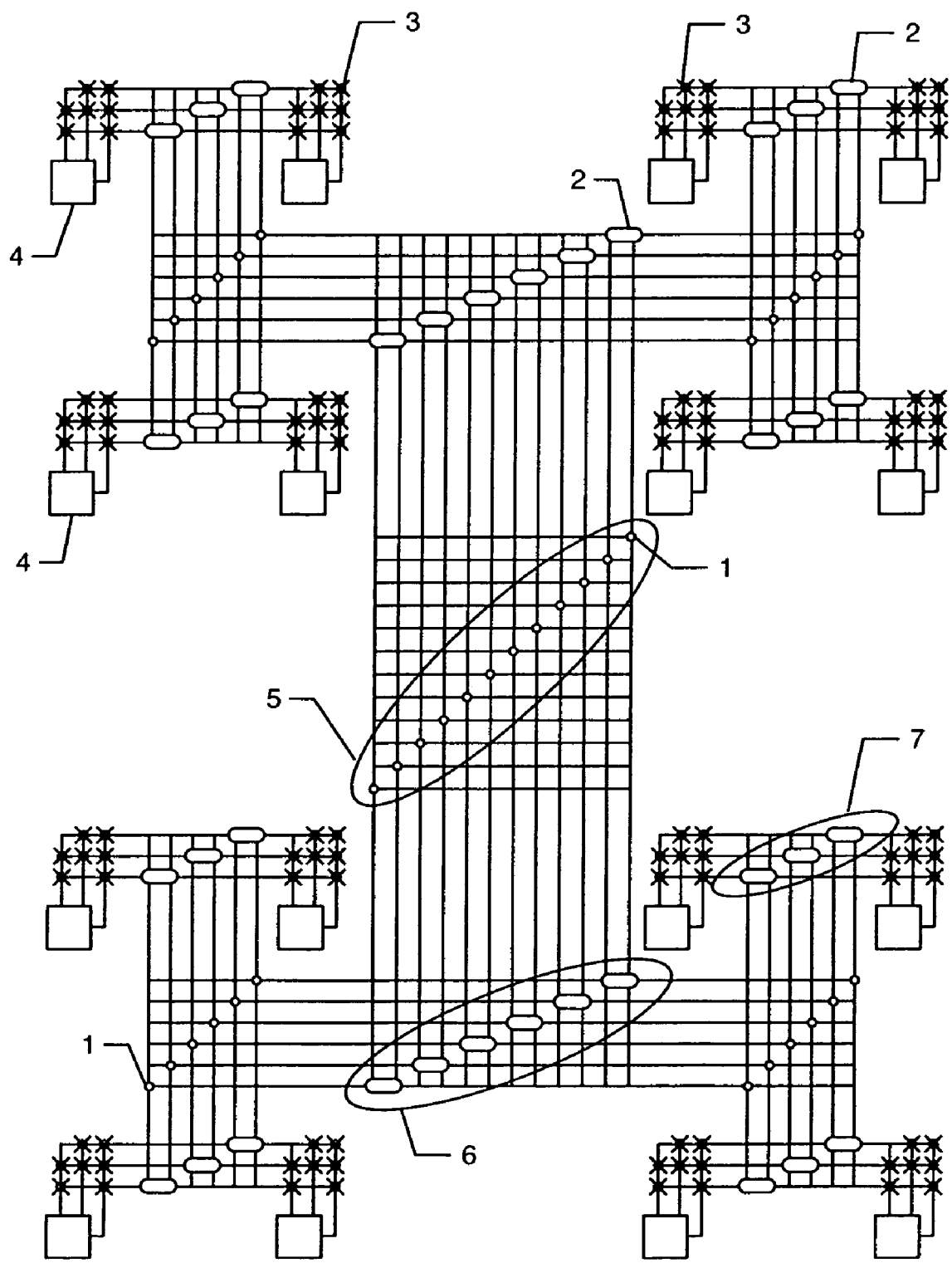
FIG. 1, already described above, shows an HSRA network.

With reference to the network switches 1, 2, 3 shown in FIG. 1, an aspect of the present invention advantageously provides a logical OR between the two children channels and the parent channel, allowing the status of the children channels to be sent back to the parent channel. The OR is conditioned on the switches not being in use.

Figure 4:
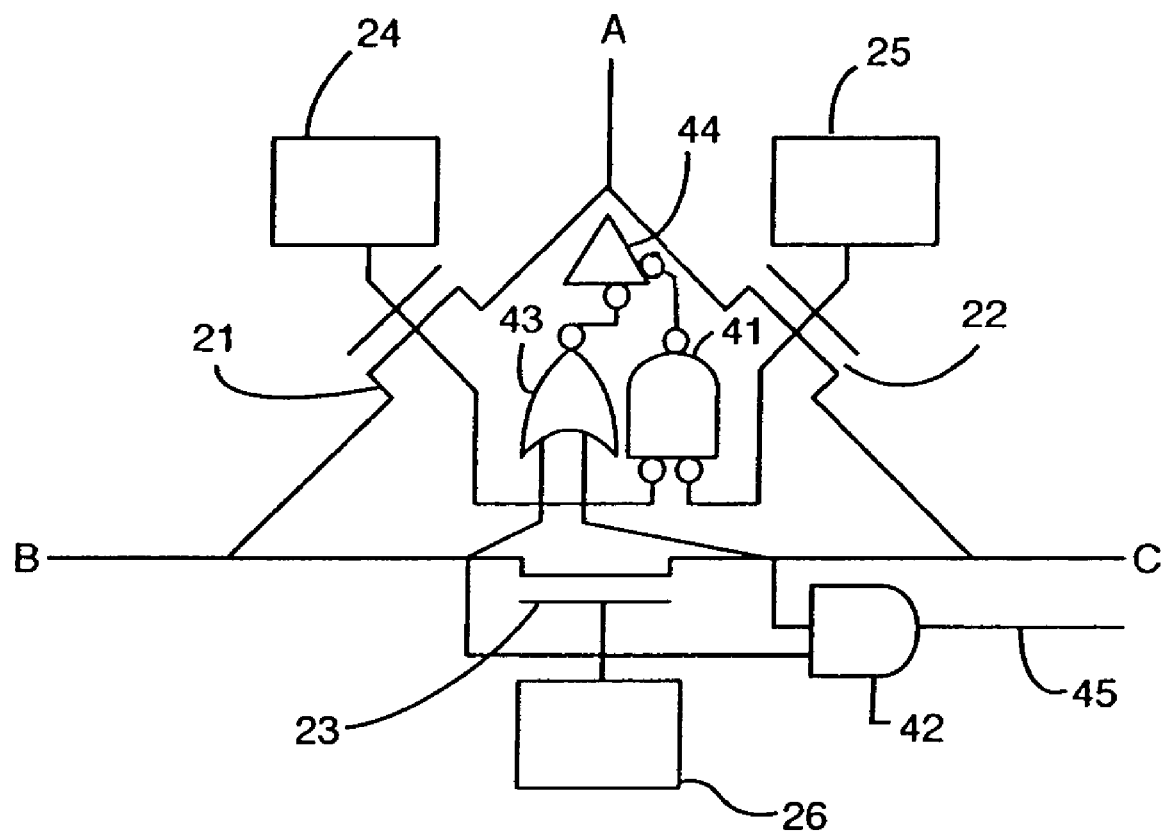
FIG. 4 shows an augmented T-switch.

FIG. 4 shows an embodiment according to an aspect of the present invention with reference to a T-switch as shown in FIG. 2. In particular, the T-switch according to the present invention additionally comprises two AND gates 41 and 42, an OR gate 43, and a tristate buffer stage 44. The AND 41 allows to identify when the switch is in use or not. The OR 43 allows path search when the switch is unused. If, for example, the switch is in use for an up-connection (side A connected to side B or side A connected to side C) then the switch behaves normally and the parent wire is simply connected to a child and propagates signals on the child to the parent (or vice versa) as it normally would. However, if both configuration bits 24, 25 are unused, the tristate buffer 44 will be enabled and the added logic of FIG. 4 will OR together the child inputs B, C and place such result on the parent side A of the array. Therefore, the above configuration of FIG. 4 allows the switch to propagate a one which appears on either child B, C to the parent A. This feature will be used to mark a potential path which is available for allocation, as shown in more detail below. FIG. 4 also shows an AND 42, used to identify the presence of a one on both child sides, thus providing a one on connection 45. The reason for the AND 42 will be explained below in more detail.

A similar augmentation can be performed on a π-switch. The person skilled in the art will readily determine a hardware configuration for an augmented π-switch, having in mind the embodiment of FIG. 4. This kind of logical augmentation can also be easily adapted for rebuffered and clocked switchpoints as well, and also switches with more than two children links and/or more than two parent links.

The hardware-assisted routing method comprises the following steps:

1. All endpoints 4 of FIG. 1 are set to drive zeros into all unused input and output connections to the network and all allocated source lines. Allocated sink lines will be left undriven as they will be driven by their associated sources.
2. For the designated source-sink pair to be routed, a one is driven into each unused (available) network connection.
3. The driven ones propagate through the network to the unique crossover switchbox. Propagation of the driven ones is made possible by means of the OR logic shown in FIG. 4.
4. At the crossover switchbox, a switchpoint which receives a one on both of its sibling sides (for example sides B and C of the augmented switch shown in FIG. 4) is searched for. A matched pair of ones indicates a complete path from both the source and the sink. Such switchpoint will have a one on a "valid path" line such as the line 45 of FIG. 4. Therefore, the role of the AND 42 and line 45 is that of allowing a matching switchpoint to be determined.
5. The unique path associated with one such matched pair is allocated by setting the switches accordingly to connect this path. This means this path will have zeros driven into it in the future and will not be considered in subsequent route searches.

Figure 5:
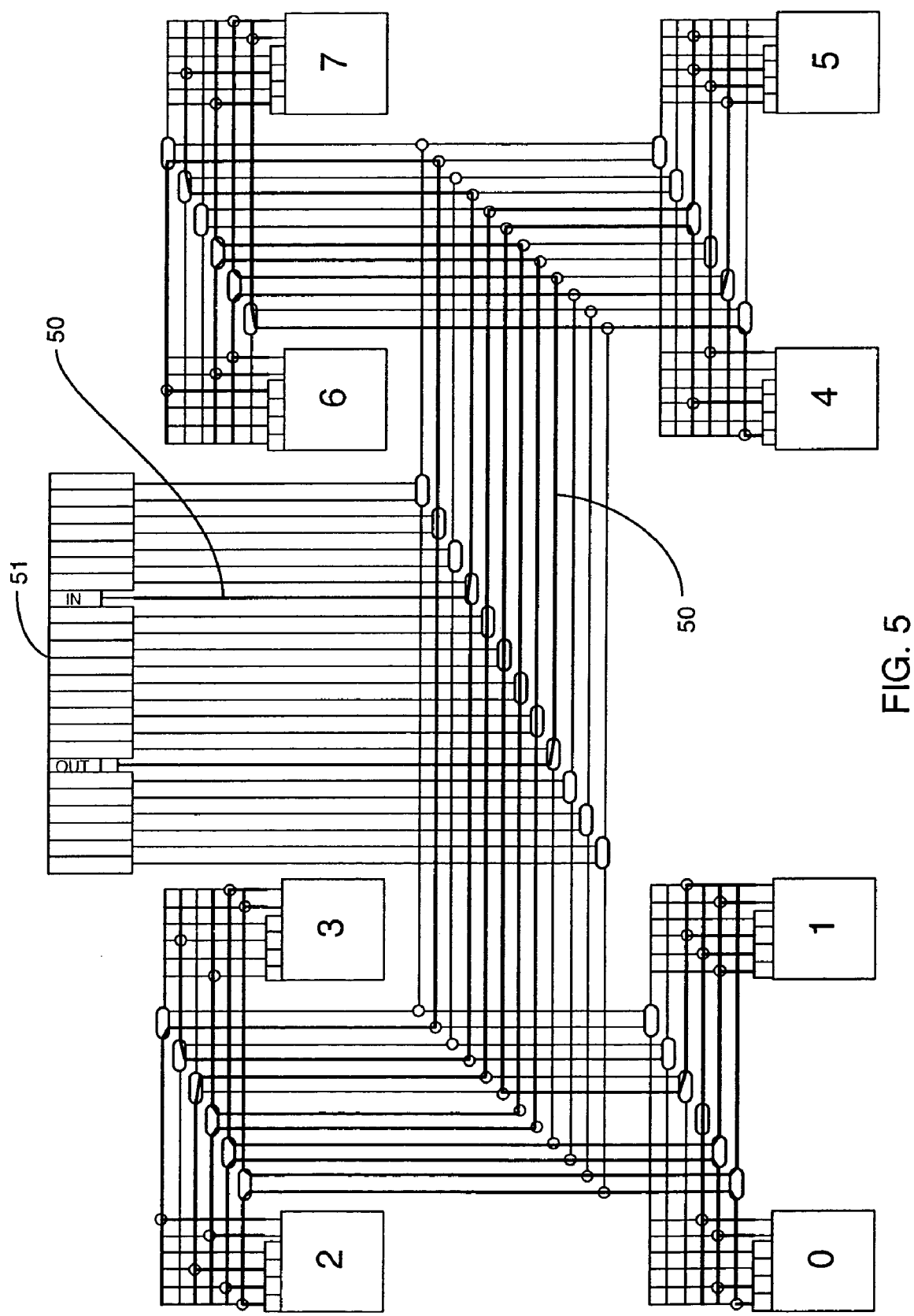
FIGS. 5-7 show an example of a route search.
Figure 6:
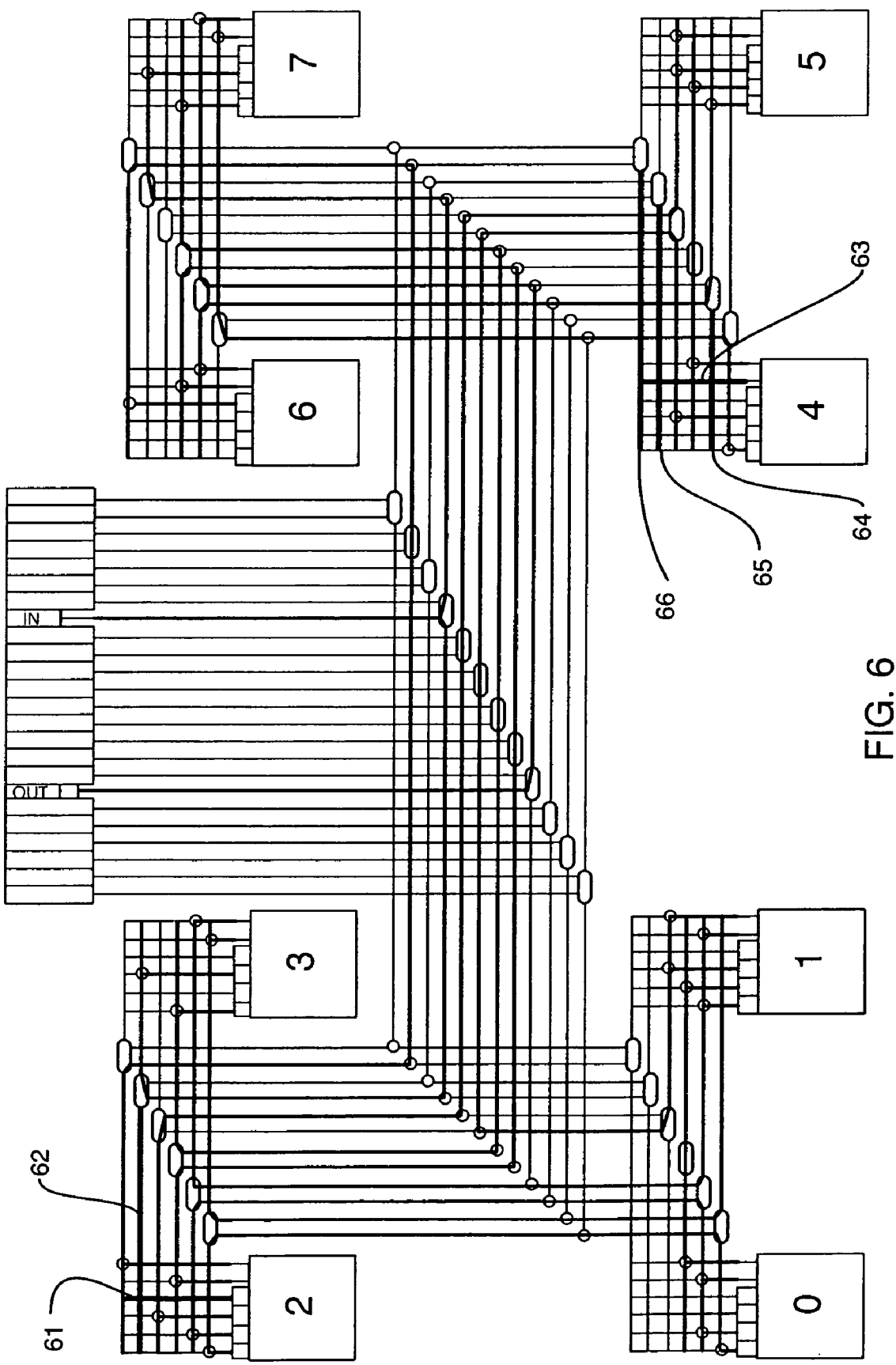
Figure 7:
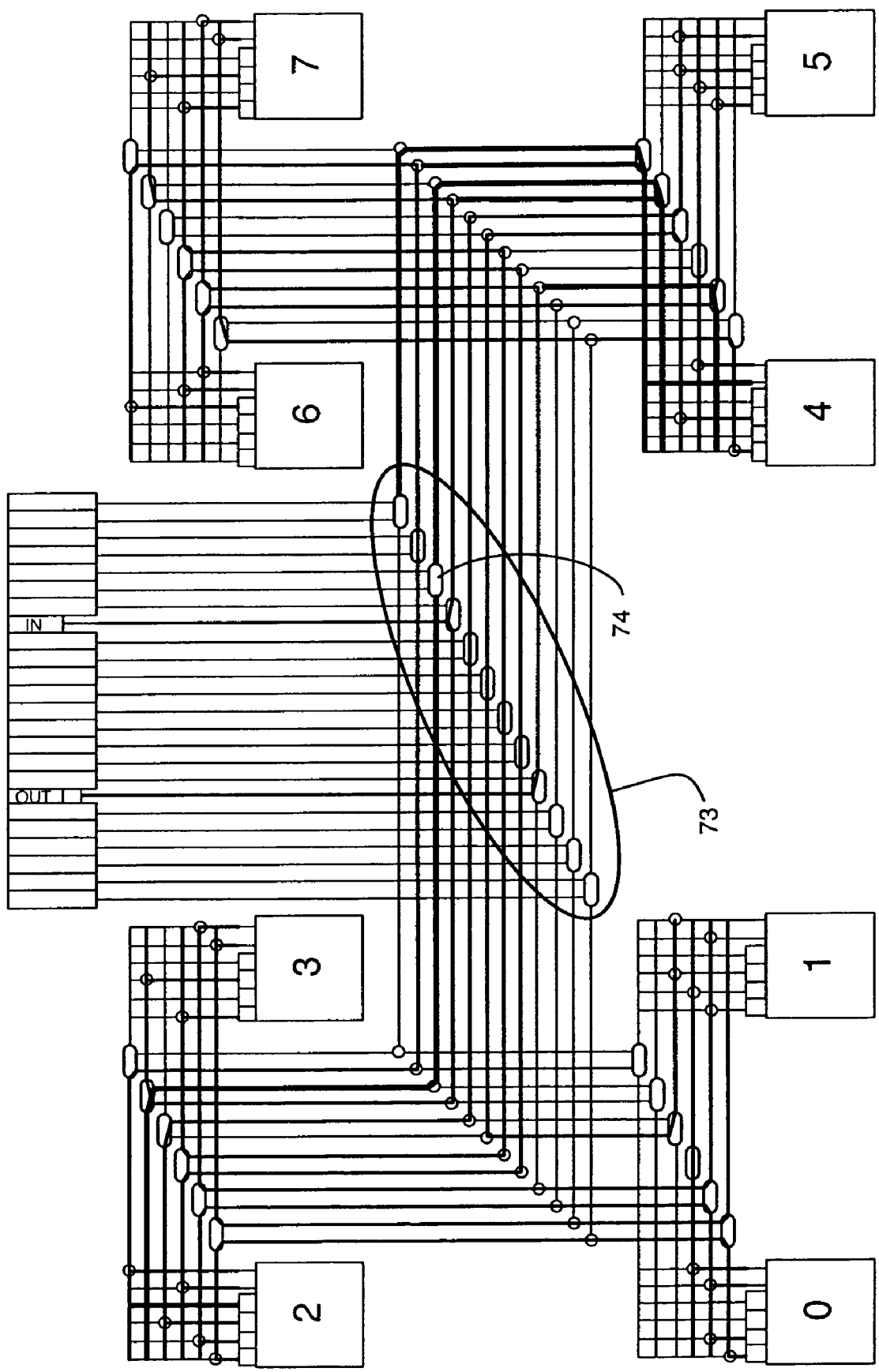

FIGS. 5-7 show an example of the route search according to the above outlined steps, where a path search from node 4 to node 2 is shown.

As shown in FIG. 5, according to the first step of the method, all nodes 0-7 are set to drive zeros into all unused input connections to the network. The light, thick lines 50 of FIG. 5 show pre-existing, allocated routes which cannot be used in the node 4-node 2 route search. Element 51 in FIG. 5 represents an external I/O from the network.

As shown in FIG. 6, according to the second step of the method, for the designated source-sink pair 4 to 2, a one is driven into each unused network connection. See segments 61 to 66 of FIG. 6.

As shown in FIG. 7, according to the third step of the method, the driven ones propagate through the network to the unique crossover switchbox 73. At the crossover switchbox 73 there is only a single switch, switch 74, which has a one arriving from both child sides and therefore a one on its valid path connection. The switch 74 allows the route from node 4 to node 2 to be identified.

According to the fourth step of the method, the unique path associated with nodes 4 and 2 and passing through switch 74 is allocated, by correspondingly setting the switches in the path from node 4 to node 2.

The search and allocation steps performed as above can be successively performed for every network connection in the design.

The Multiple-Path Selection Step

Therefore, the present invention uses the network itself (i.e. hardware) to explore all paths simultaneously, differently from a software procedure like PathFinder which serially explores all the possible paths between source and sink until a free (or inexpensive) path is found. The method disclosed above is fast because all the switched paths are instantiated in hardware and directly connected by wires. Therefore, it takes only the signal propagation delay across the wires and switches to trace back all possible paths.

In the example of FIGS. 5-7 only a single available path has been found. However, available paths can also be more than one. Should this be the case, a path can be selected deterministically from the available paths with some fixed priority scheme, or a random selection can be performed.

For example, a pseudo-random number generator (PRNG) and a cyclic segmented parallel prefix (CSPP) circuit can be generated, as shown in Bradley C. Kuszmaul and Dana S. Henry, "Cyclic Segmented Parallel Prefix," Ultrascalar Memo 1, Yale, November 1998. The PRNG indicates which crossover switch is preferred for allocation. The switches which are not selected are masked out, and the CSPP circuit is used to identify the first circuit candidate switchpoint identified by the path search. The CSPP circuit allows to identify the path in O(log(W)) time, where W is the number of switchpoints in the switchbox. Experimental results have shown that use of the PRNG-CSPP generation scheme is indistinguishable from the use of a pure random number generation.

Figure 8:
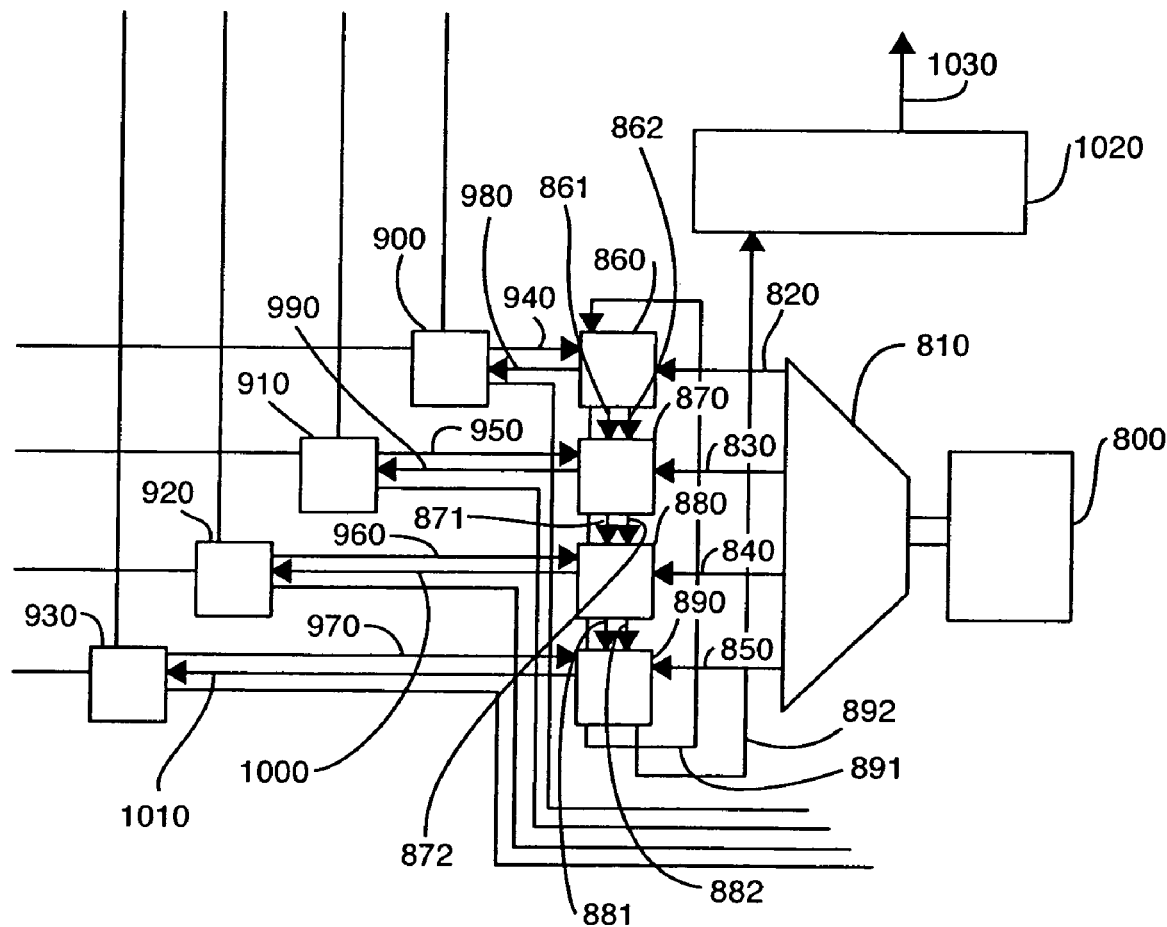
FIG. 8 shows a circuital diagram for random selection of switches.

FIG. 8 shows a schematic circuit embodying a logic for random path selection. A pseudo-random number generator 800 generates a densely coded (standard binary number). A decoder 810 turns the number into a 1-hot encoded number, thus outputting a one on one of the decoded lines 820-850 and a zero on the other lines. Alternative embodiments with an already decoded output from the generator 800 are also possible. The one coming out of the decoder 810 indicates the preferred switch to the digital logic circuits 860-890. Each of the circuits 860-890 is connected to a respective switch, for example a T-switch, 900-930. If there is a path to the switch connected to the logic circuit receiving a one from the decoder 810, shown by the status of signals 940, 950, 960 or 970, that switch will be selected for allocation, along one of the paths 980, 990, 1000 or 1010. Otherwise the one is allocated to another logic circuit, for example the logic circuit immediately following the logic circuit receiving the one from the decoder. Allocation of the one among logic circuits is made possible by means of the signals 861-891 and 862-892.

By using a cyclic prefix as shown in figure, there will always be a fully ordered set of priorities from the preferred switch. Therefore, if decoder 810 prefers switch 920, the order of preference among switches will be 920, 930, 900, 910. The logic in each of the logic circuits 860-890 implements this priority scheme. In particular, if the inputs 820, 830, 840, 850 are called 'start_here', the inputs 940, 950, 960, 970 are called 'valid_path', the outputs 980, 990, 1000, 1010 are called 'allocate', the outputs 861, 871, 881 are called 'alloc_avail out', the output 891 is called 'alloc_avail', the outputs 862, 872, 882 are called 'alloc_made_out', and the output 892 is called 'alloc_made', the following expressions (where + indicates an OR, * indicates an AND and/indicates negate) govern the behavior of logic circuits 860-890:

allocate=(start_here+alloc_avail)*valid_path alloc_avail_out=(start_here+alloc_avail)*/valid_path alloc_made_out=alloc_made+allocate The element 1020 describes the switchbox control logic, the output 1030 of which indicates status to the route control. Therefore, the logic circuits 860-890, based on the signals 820, 830, 840, 850 either allocate or pass on the allocate preference to the next element in the path (alloc_avail_out). Subsequent switches look at the alloc_avail signal to see if they get a chance to allocate. They will either allocate (and stop propagating alloc avail_out) or pass along the signal. In a similar manner, as soon as a logic circuit allocates, it sets the alloc_made signal so that the switchbox control logic 1020 (and ultimately the route controller) will be informed that a path was found and allocated.

The Victimization Step

The present invention also takes into consideration embodiments where no available path can be found. A first way of approaching this kind of scenario is to provide that the path to be found shares resources with the least congested existing path. However, in this way the state and complexity of mechanism required to support it are increased.

A second victimization embodiment, more effective with hardware implementation, provides ripping-up conflicting routes in order to expose an available path. This raises the question of which routes to victimize. For example, the path that would disturb the least existing switched connections could be identified. Such a selection would be roughly equivalent to selecting the path with least congestion, ignoring any history information. A third victimization embodiment provides for random selection among all possible paths. If the conflicting paths have alternatives, then they can be rerouted.

The random scheme (e.g. the PRNG-CSPP generation scheme above) is a simple scheme to select among multiple available paths. The main advantage of the random scheme is that it is inexpensive to implement in hardware. However, selecting a victim randomly sometimes produces bad choices, leading the router away from a valid solution or at least causing the router more time to converge. According to a fourth victimization embodiment, the selection process among available routes is biased to improve the quality of the router and help the router to converge more quickly.

Intuitively, one might expect that the best path to select is the one that does the least damage to existing routes. One way to measure this is to count the number of switches which any new, candidate route shares with existing routes. During a route search, if a switch is occupied, the cost of the route will be increased by one. At the crossover switchbox, a free path will be selected if possible, or alternatively the least congested path. Experiments conducted by the inventors have shown that a 'count congestion' approach has a higher probability of achieving a better quality route than the random approach.

Figure 9:
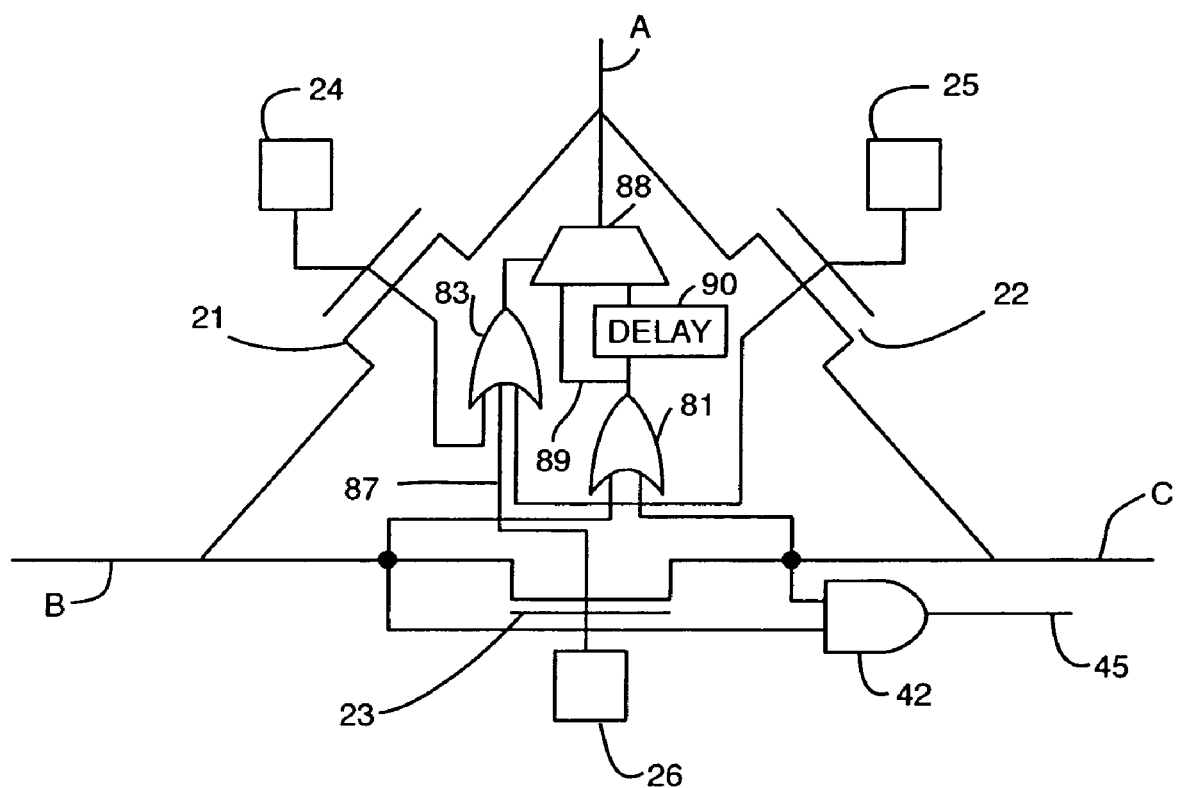
FIG. 9 shows a hardware implementation of a congestion count approach.

FIG. 9 shows a hardware implementation of the count congestion approach. According to the implementation of FIG. 9, if the switch is occupied (child-parent link in use), the search signal is delayed by one cycle. Therefore, the first search signal to arrive at the crossover switchbox is the path least congested.

More in particular, FIG. 9 shows an OR gate 81 which is analogous to the OR gate 43 of FIG. 4. The connection between the output of the OR gate 81 and the parent side A is controlled by an OR gate 83, which is substantially analogous to the AND gate 41 of FIG. 4. If the output of the OR 83 is zero (control bits 24 and 25 are zero, i.e. both child-parent switches are not set), the output of the OR 81 is transmitted to the parent side A. If the output of the OR 83 is one, the output of the OR 81 is delayed. In particular, if the output of the OR 83 is zero, the multiplexer 88 will select the path 89 for the output of the OR gate 81; if the output of the OR 83 is one, the multiplexer 88 will delay the output of the OR gate 81 through the D element 90, which could be either a single register or a plurality or registers, as is more typical in the case of meshes. The embodiment shown in FIG. 9 also takes into consideration the optional approach of delaying the output of the OR 81 when the switch is already used for crossover by another net, so that the crossover switch 23 is set. In such case, there is no sense in considering that switch for the new path, because it is already used for a different path. Therefore, the one on the connection 87 will prevent propagation of the one at the output of the OR gate 81.

Figure 10:
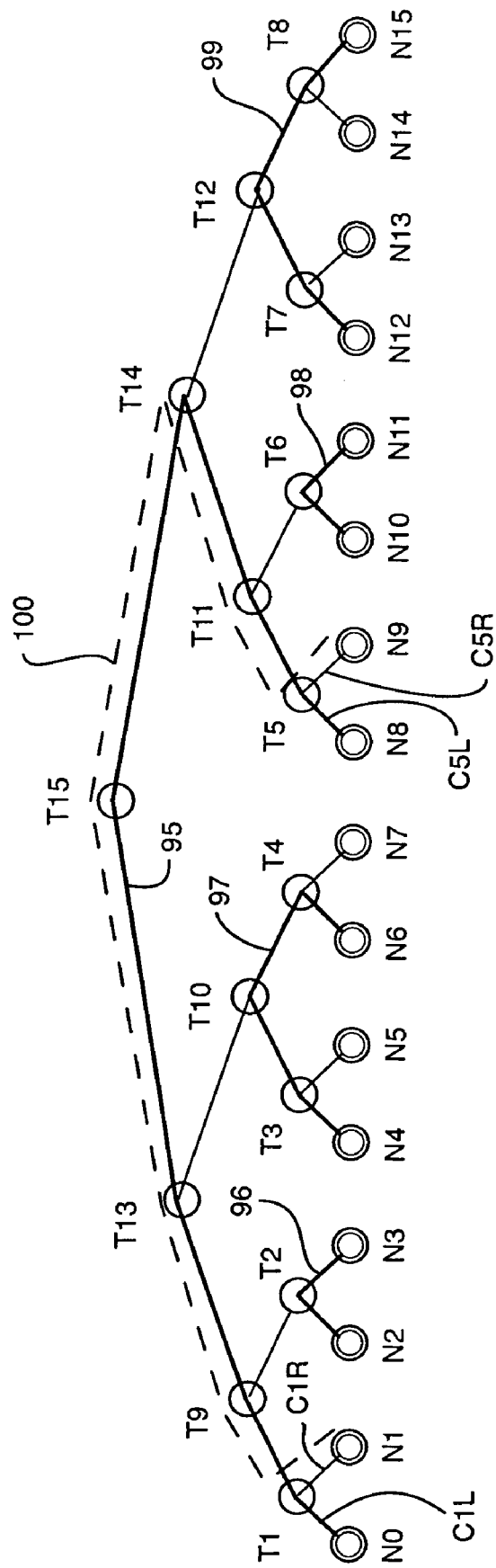
FIG. 10 shows a binary tree explaining a net count approach.

A second way of biasing victim selection is to count the number of nets that would be victimized if a path were selected. FIG. 10 shows one wire channel of a size-sixteen (p=0) tree, where p is the exponent in Rent's rule, as explained, for example, in B. S. Landman and R. L. Russo, On Pin Versus Block Relationship for Partitions of Logic Circuits, IEEE transactions on computers, 20:1469-1479, 1971.

Black nodes N0-N15 represent endpoints of a network, while grey nodes T1-T15 represent T-switches. For example, the children of switch T1 are connected to endpoints N0, N1 and the parent of T1 is one of the children of T9, the other child being the parent of T2. Lines 95-98 are represented by a solid line and show existing paths or nets. Usually, the term 'path' defines a set of nodes connected with reference to a single source-sink pair, while the term 'net' is used when a single source is connected to a plurality of sinks (fanout connection, as later explained in more detail). When a net has to be routed, there will be paths from the source to each of the sinks.

Suppose we were to perform a route search from node N1 to node N9, as shown in the dotted line. The count congestion method performed by the hardware of FIG. 8 will return a congestion cost of three. In particular, on the upward search from N1 to the crossover switch N15, three intermediate switches already in use are passed: T1, T9, and T13, therefore a delay of three. In parallel to this, the path from N9 to T15 also gets charged a cost of three (T5, T11, T14). At T15, detection is made of the arrival time of the last of the two sides. Since both sides arrive at the same time, the cost will be simply a cost of three.

On the other hand, a count net method will return a cost of one since there is only one net occupying the path. The count net scheme directly reflects the number of existing nets affected by this path and, consequently, the amount of re-routing work that has to be done if a path or net were chosen to be ripped-up.

With reference to FIG. 10, it can also be observed that a search signal and a routed net can "interact" at only two switches, entering switch T1 and exiting switch T5, as shown in FIG. 10. At those two switches, the configuration of the switch will be different from the search direction, because the switch will be set to receive a signal along one of its children, while we will try to establish a path along the other child. In particular, with reference to switch T1, we are trying to establish a bottom-up path along its right child C1R, while a path has already been established along its left child C1L. With reference to switch T5, we are trying to establish an up-bottom path along its right child C5R, while a path has already been established along its left child C5L. With additional hardware support, if a switch such as switch T1 is occupied and has a configuration different from the search direction (i.e. configuration on the right and search direction on the left or vice versa), we have encountered a new net and will delay the search signal by one cycle.

Figure 11:
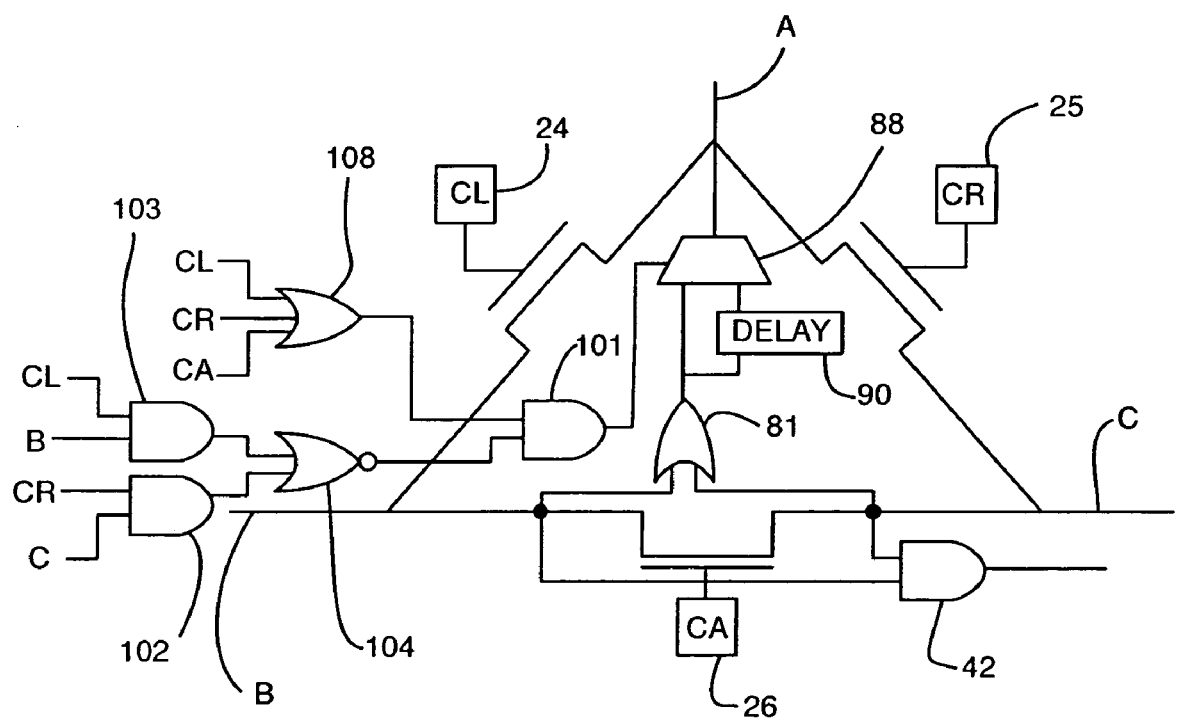
FIG. 11 shows a hardware implementation of the net count approach.

FIG. 11 shows a hardware implementation of the above technique, which requires only four additional gates, i.e. AND gates 101, 102, 103 and NOR gate 104. In particular, the two-input OR 81, the delay register 90, and the MUX 88 are the same as the corresponding elements of FIG. 8. The three-input OR 108 is substantially similar to three-input OR 83 of FIG. 8, the main difference being that there is a delay of the output of the OR 81 only when also the output of the NOR 104 is one, i.e. when the outputs of both AND 102 and AND 103 are zero. When we are trying to establish a path through C (right side) and the left switch (CL) is set (conflicting input), we have that CL=1, B=0, CR=0, and C=1. Therefore, the inputs to the NOR 104 are all zero, and the output of the NOR 104 and of the OR 108 is one, so that there is a delay. If we are trying to establish a path through C and the left switch is not set (CL=0, unused switch), the output of the OR 108 will be zero and there will be no delay. If we are trying to establish a path through B (left side) and the left switch is set (consistent input, see for example T9 in FIG. 10), we have that the output of the AND 103 is one, thus no delay. In conclusion, there is no delay in case of consistent inputs or unused switch, and there is delay in case of consistent inputs.

The Allocation Step

Allocation of the path associated with the matched pair of endpoints requires setting the switches accordingly to connect the path, as already noted above. This means that the path will have zeros driven into it in the future and will not be considered in subsequent route searches. In order to perform the allocation step, a route allocation mechanism may be built into the network.

Figure 12:
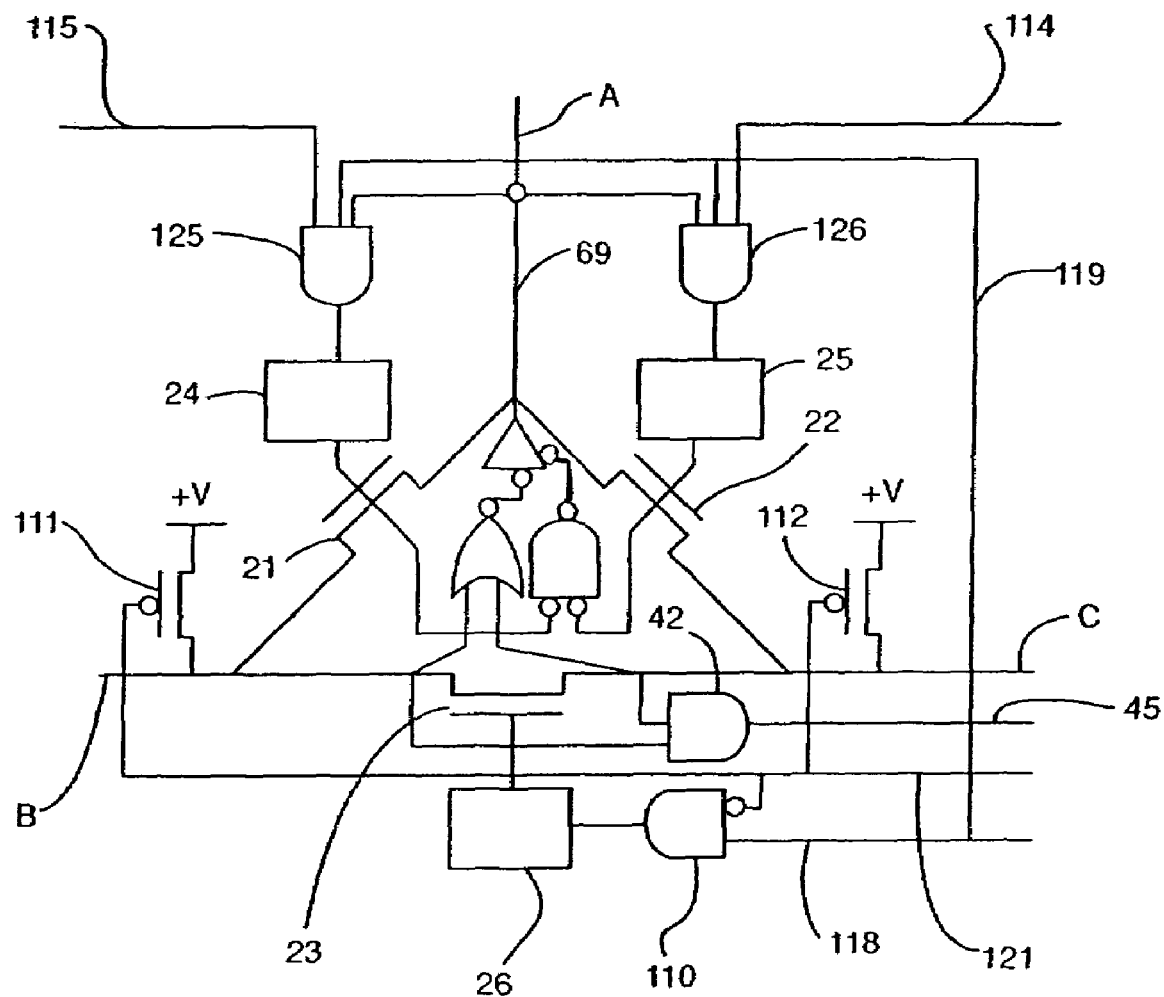
FIG. 12 shows a switch with a route allocation mechanism.
Figure 13:
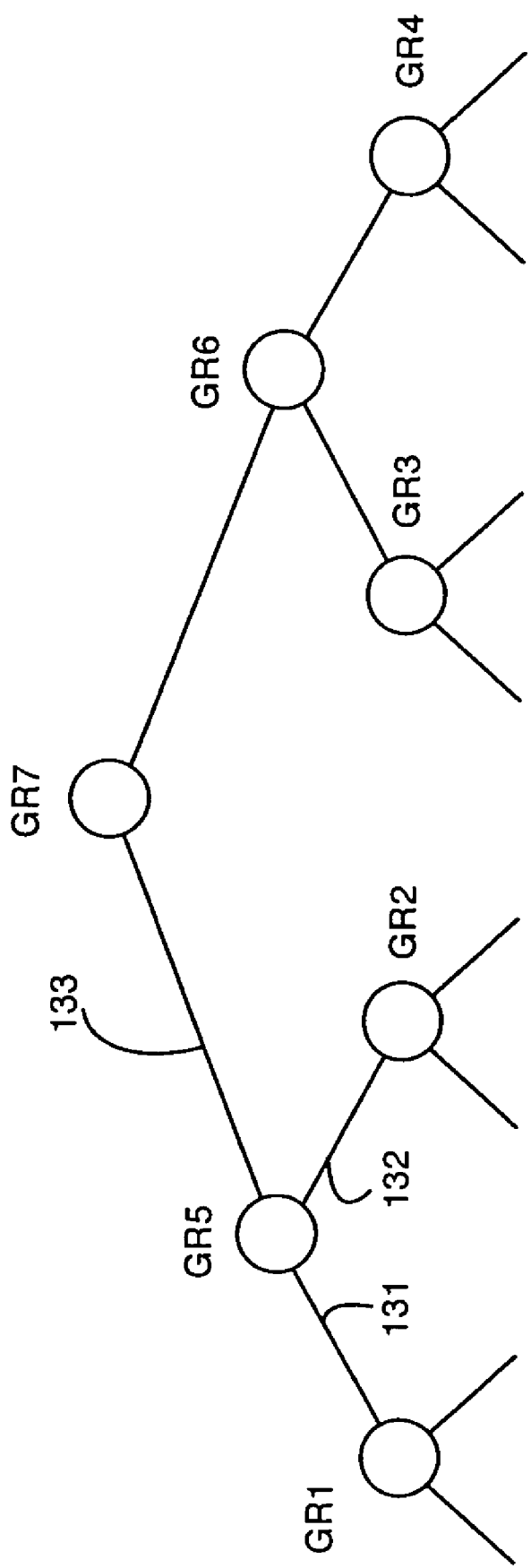
FIG. 13 shows an example of a global route binary tree.

FIG. 12 shows in detail a preferred embodiment of the route allocation mechanism according to the present invention. The route allocation mechanism comprises an extra AND gate 110 for each switch, an "allocate" pull-up 111, 112 at the crossover switch 23, and a global-route binary tree to identify the global route path, i.e. the unique set of switchboxes connecting the source to the sink. For example, the global-route binary tree can be represented by a series of ORs, as also shown in FIG. 13 below.

In particular, once a possible route has been found in the path search step, the normal network paths are not driven anymore and an "allocate" request is driven from the crossover switchbox: a one is sent back down the selected path to perform the allocation. Each switch which receives this one performs the actual allocation on the appropriate parent-child link, propagating the allocation, in turn, down to that child; the global-route tree shows the switchpoint which child connection to allocate.

FIG. 12 shows connections 114 and 115 of the global-route binary tree. If the one comes along the parent connection 69 and connection 114 holds a one, the parent will be connected to the right child. Conversely, if the one comes along connection 69 and connection 115 holds a one, the parent will be connected to the left child.

The allocation begins at the crossover switch, i.e. the switch having a one on both of its left and right child B, C, which establishes a "valid path" signal 45 by means of the AND 42, as already explained above. In a first step the source and the sink drive are deasserted, so that the left child side B and the right child side C are set to zero. In a second step, an "allocate phase" signal along connections 118, 119 is set to one, thus setting the configuration bit 26 to one and allocating the crossover switch, i.e. connecting the left child side B to the right child side C. In a third step, a signal along connection 121 is asserted. The signal will drive the pull-up transistors 111, 112 and establish a one on the children B, C. At that moment, the one along connections B and C will begin to propagate along the network at the left of side B and at the right of side C and enter the other switches on the parent side. The ANDs 125, 126 will allow propagation of this signal through the left up-down switch 21 by means of the configuration bit 24 or the right up-down switch 22 by means of the configuration bit 25 only if the connection along those switches is part of the established path, as determined by the global route binary tree connections 114, 115, one of which will carry a one. In this way, all switches making part of the connection are set.

It should be noted that the global-route tree allows the switchpoint to know which child connection to make, because it provides this information. The global-route tree is only used during routing, so it can be shared with other control functions that are needed only during operation.

Incidentally, it should also be noted that the various features shown in the previous figures and the features of the figures that follow (victimization, fanout) may be combined so that, for example, allocate logic can be provided also with switchboxes of the type shown in FIGS. 9 or 11.

FIG. 13 shows a schematic representation of the binary global-route tree, where each node GR1 . . . GR7 is an OR, which takes the two children as inputs and produces an output on the parent link. For example, node GR5 takes the children 131, 132 as inputs and produces an output on the parent link 133.

Figure 14:
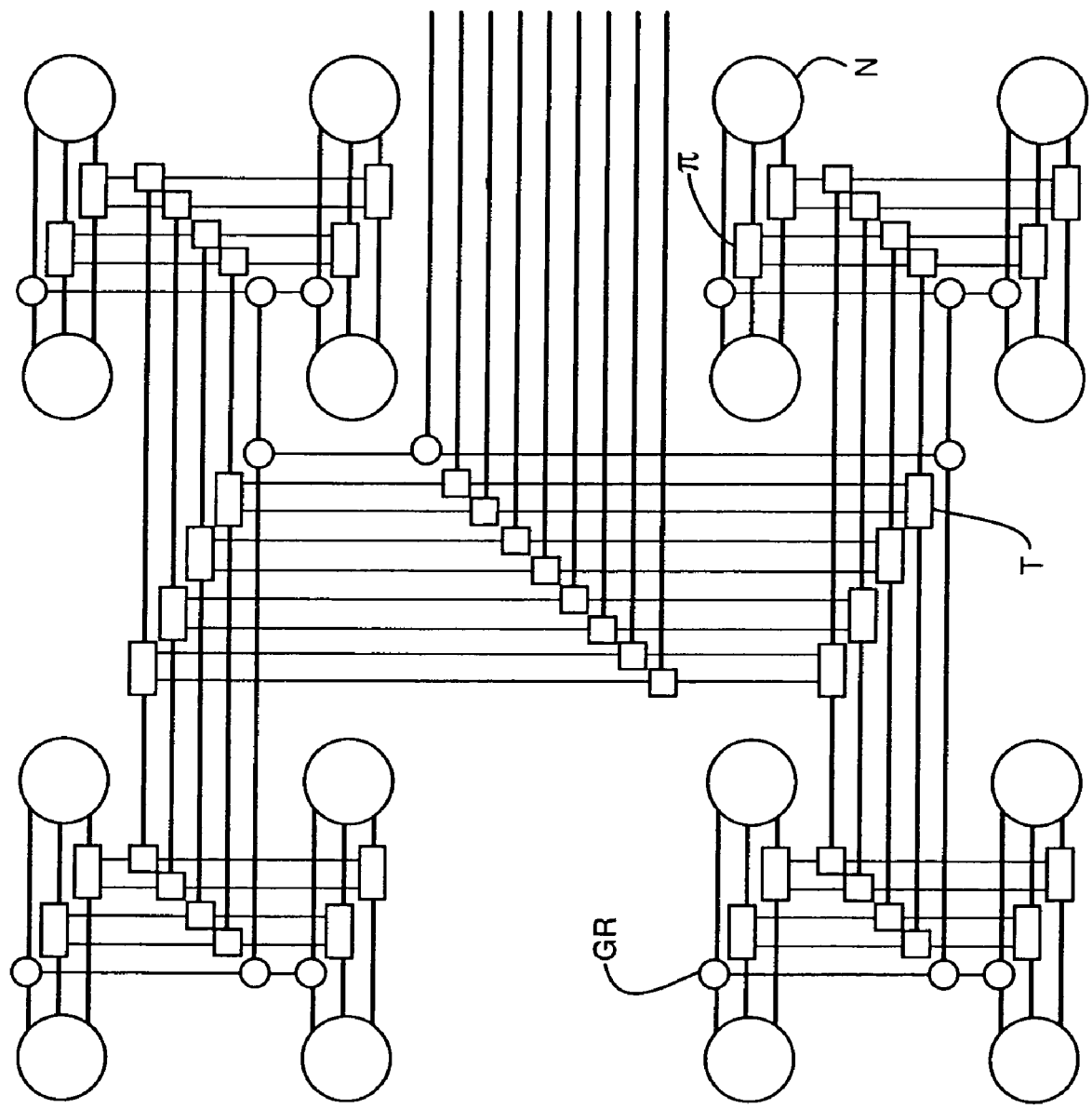
FIG. 14 shows a network comprising the global route binary tree.

FIG. 14 shows a schematic representation of a global-route tree connected to a network according to the present invention, where endpoint nodes N, T-switches, π-switches and global-tree nodes GR are shown.

During the allocation phase detailed above, the three control signals (source/sink deassert signal, allocate_phase assert signal, and allocate_this_path assert signal) are sent in sequence. According to a preferred embodiment of the present invention, the three signals can be advantageously pipelined. In this way, the time spent for allocation will equal one trip through the network plus a small constant number of cycles to drain the pipeline.

Figure 15:
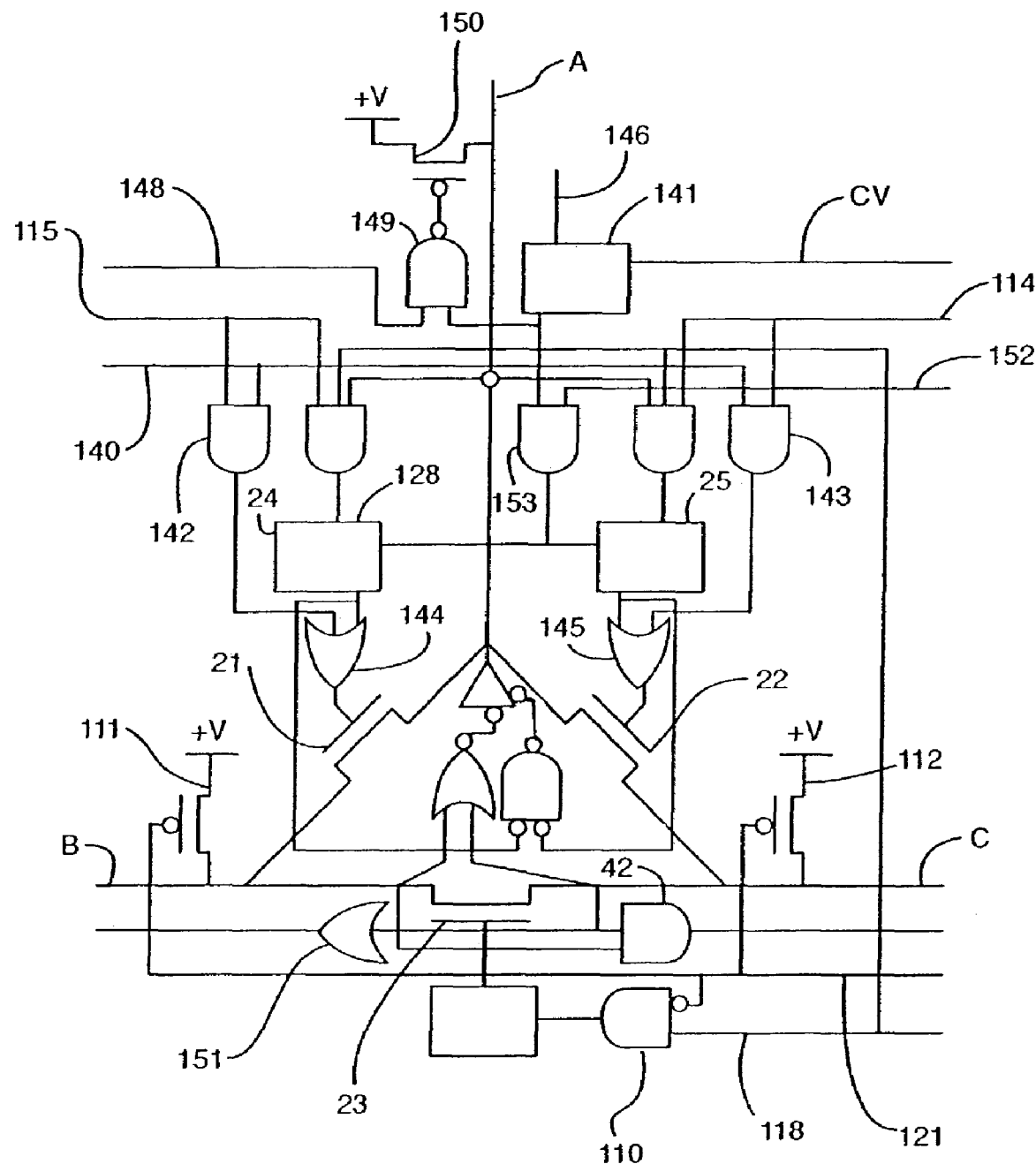
FIG. 15 shows an example of the logic used to perform victimization.

As already noted above, when no free routes are founds, existing routes are deallocated (victimized) in order to make a new route. FIG. 15 shows an embodiment of the logic to perform victimization. According to the embodiment of FIG. 15, the configuration bits can now be both set and cleared and signal propagation can be overridden, in order to propagate victims.

The logic shown in FIG. 15 needs to identify the intersecting paths and propagate the fact that the path is a victim to all switchpoints along the path before actually clearing the switchpoints. Therefore, a first crossover-to-leaf trip is used to identify the intersecting paths. A second crossover-to-leaf trip is used to propagate the fact that a path is a victim to all switchpoints along the path. A third trip allows then to clear the switchpoints. A fourth, final, trip is then performed to establish the new allocation.

Six different steps are performed:

In a first step, a 'victim identification' signal 140 is asserted and a victim latch 141 is set. The victim latch 141 is set if the parent A ('parent') is true, the victim identification signal 140 ('victim_ident') is true, and either the configuration bit 24 ('config_left') or the configuration bit 25 ('config_right') are set. In particular, the input 146 ('victim') to the victim latch 141 is established by the following logic expression (where, as usual * indicated AND and + indicates OR), where the last part of the expression ('parent*drop_bit') will be explained later:

Victim=parent*victim_ident*config_left+
parent*victim_ident*config_right+
parent*drop_bit Once set, the victim latch 141 stays set until cleared by the clear victim signal CV of FIG. 15. If the switch is part of the global-route path, there is a one on one of the global route connections 114, 115 which causes either the AND 142 or the AND 143 to input a one in either one of ORs 144, 145 thus enabling up-down switch 21 or up-down switch 22 independently of the status of the configuration bits 24, 25. In this way, as soon as the crossover switch 23 is pulled up by means of the third step of FIG. 11, a one travels all the way down along the global route path, setting, for each switch which is encountered and was previously in use for a different route, the victim latch 141 to one along latch input 146 according to the logic above. As a consequence, at the end of the first step, all victim latches are set to one everywhere the new path intersects an old path.

In a second step, a victim search signal 148 is asserted so that, as long as the latch 141 is set, the AND 149 allows switching of the pull-up transistor 150, thus driving the parent link A to a high value. Where existing configurations 21, 22 are set, they will allow this one to now propagate throughout the entire existing network; that is, all switches in all paths will now see a one in them. At the crossover switch for each such route, OR 151 will be enabled indicating that that crossover switch is on a victim path.

In a third step, a one is driven on all victimized paths at their respective crossover switches (as just identified via OR 151 in the previous step), thus guaranteeing that there is a one on the parent link of all routes which should be victimized. Additionally, a 'drop bit' signal is asserted on the input 146 of the latch 141, so that the victim latch will be updated to reflect these drops, as also reflected by the last portion '+parent*drop_bit' of the expression above.

Therefore, in the first step the immediate victims (points of intersection) are set. In the second step that information is propagated to the top of each path. In the third step, that information is propagated from the crossover, so that every switch can be marked along the victimized path. As a consequence, more victims are added.

In a fourth step, a 'drop' signal 152 is asserted, which allows the switch transistors 127, 129 to be cleared, through the AND 153. In this way the old paths are cleared from the victim switches.

In a fifth step, the endpoints are polled to discover the victims, and in a sixth step a normal allocation on the now cleared path is performed.

According to the above embodiment, it is also easy to know which routes were victimized. In particular, at the end of the victim propagation step, the sink will know, by the position of the input, which source is lost. If the sink knows which source is associated with this input, that is enough information for it to inform the route controller which source-sink pair(s) has been ripped up and needs to be re-routed. It is possible that many paths are victimized during a single deallocation. All victim paths can be identified by a binary collection tree in at most log(N)+number of victims cycles.

Alternatively, the controller can poll each endpoint, but this technique will identify the victim paths in at most N cycles. A second alternative could be that of building another binary tree that arbitrates based on priority and passes up victims so that, if the tree is set to give priority to left, each node passes first data from the left and then data from the right. In this case, identification will occur again in at most log(N)+number of victims cycles. A further faster alternative could be that of adopting a hybrid that uses a 1-b version of the binary tree to quickly identify where the victims are, and then uses polling to get the results. A still further alternative can use a set of masked requests ('Does anyone in P0 . . . P15 have victims? If no, how about P16 . . . P32? etc). Based on the reading of the present application, the person skilled in the art will be able to find additional alternatives.

Similarly to the allocation step above, the time required for the victimization step can be reduced if the control signals are pipelined. Experiments conducted by the inventors have shown a speed up of over 2100 when compared with a pure software method, even in absence of pipelining.

Software Allocation and Victimization

According to an alternative embodiment of the present invention, the allocation and victimization steps may be performed by software only, and only the route search step shown in FIGS. 5-7 is performed by hardware. In this alternative embodiment, no allocation or deallocation logic as shown in FIGS. 12 and 15 need be provided, but the configuration bits will need to be addressable to set and clear configuration bits as routes are allocated and victimized. In particular, the software bookkeeping will need a table to track switch usage. This table is indexed by switchpoint identification as shown in FIG. 16 and contains: switchpoint identification 151 for the left child switch of this switchpoint; switchpoint identification 152 for the right child switch of this switchpoint; identification 153 of the net that is using this switchpoint (if used); switchpoint identification 154 for the crossover switch for the route through this switchpoint when in use.

Route search is initiated as before using the hardware OR-up logic. When an available route is found, the controlling processor queries the crossover switchbox to discover which path was selected. The processor then walks the switchpoint table, starting at the crossover switchpoint, and stores the net identification and crossover switchpoint in each switchpoint along the path. As each switchpoint is visited, the processor also issues a command to the network to allocate the appropriate switch bit.

With reference to the software version of the victimization step, the following steps are performed:
I Walk the switchpoint table starting at the victim crossover switchpoint
II For each switch visited:
  i) Find out if a net already occupies that segment
  ii) If a net occupies the segment, then:
    A. Add that net to the list of unrouted nets
    B. Lookup the switchpoint which is the root of the existing net connection
    C. For each switchpoint belonging to this net:
      Issue a command to the network to clear the switch bit
      Clear the net from the wire segment's entry in the segment table After deallocation of the victim paths, allocation is performed.

Application to Hypergraphs

Up to now, only point-to-point network connections have been described. However, the results shown above can also be adapted to different scenarios. One of the fields of application of the hardware-assisted method according to the present invention can be extended to route netlists with fanouts (hypergraphs). A network with fanout is a network where the path to be defined is a path between a source and a plurality of destinations, instead of being a path between a single source and a single destination.

In order to do so, a state bit is added at every switch. The configuration of a switch will be similar to the configuration already shown in FIG. 11, with the difference that in this case a state bit ATN (allocate_this_net) will be present and the MUX 88 of FIG. 11 instead of being triggered by the logic expression (CL+CR+CA)*/(CL*B+CR*C), will be triggered by the logic expression (CL+CR+CA)*/ATN*/(CL*B+CR*C). Therefore, the only logic change is not to delay the signal when ATN is set.

Figure 17:
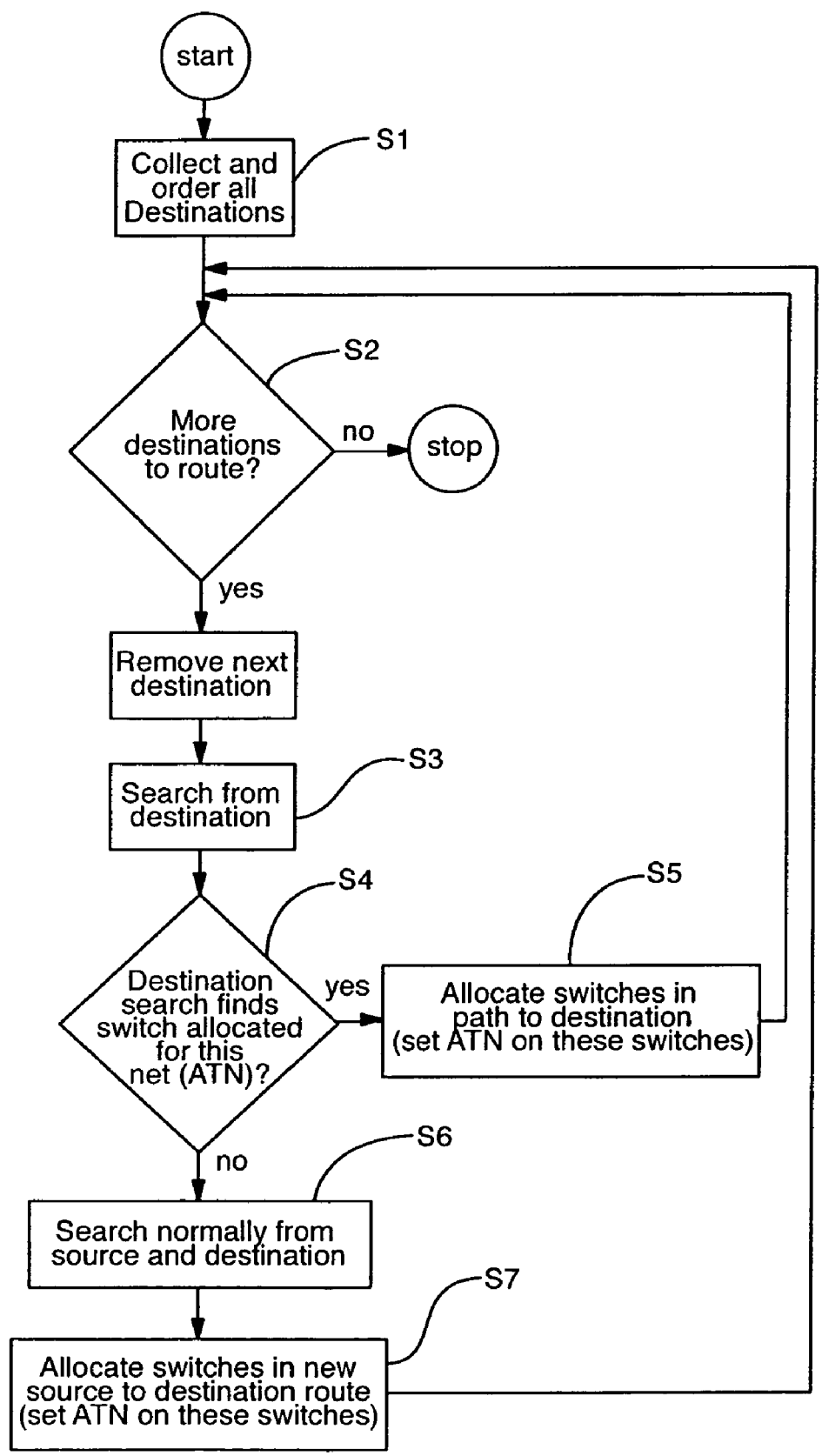
FIG. 17 shows a flowchart of a method for application to hypergraphs.

The state bit is set when the switch is allocated during the current net search (with reference to FIG. 12 this means that the signal 121 is asserted or the outputs of ANDs 125, 126 are asserted) and cleared when starting to route a new net. The following scheme is implemented, where reference is made to FIG. 17:
1. Order the destinations associated with a single source by the path length. See step S1 in FIG. 17. For a tree network, this is the same as twice the height of the crossover switchbox, i.e. the level of the least common ancestor of the source and sink.
2. For each destination (obtained through step S2 in FIG. 17)
  a) From the sink, a search signal is sent on all unused inputs and the global route signal is driven. See step S3 in FIG. 17. As already explained above, the global route signal is a global binary tree that guides the allocation process. From the crossover switch, during allocation, we need to know which child connection to make to reach the source or the sink; the global-route tree provides this information b) From the source, we do nothing and do not drive the global route signal c) At a switch, we look at the global route signal to tell us which direction is the sink side; the sink side will have the global route signal driven. The state bit will help to determine if the switch has been allocated during the current net search and therefore can be a point of fanout for the current fanout search. See step S4 in FIG. 17. If the state bit is set and the sink side is congestion free, an available path has been found d) Set the state bit ATN when allocating the path, in order to make clear that this new allocation is also part of the net currently routed. See step S5 in FIG. 17.

e) Otherwise, drive ones into all available source paths and allocate a new path, like a standard route search. See step S6 in FIG. 17. An ATN is set for all switches on the path, to make clear that this is also part of the net currently routed. See step S7 in FIG. 17.

Although the above scheme probably uses more resources than optimal, it definitely uses fewer resources than treating each source-sink connection as a separate net.

A problem with this kind of procedure when used with a count net approximation is that a net with 1,000 fanouts will cost the same as a net with no fanout. If a net with large fanouts is victimized, a large number of two-point nets will be ripped out when the large fanout net is re-routed, resulting in slower convergence and worse routing quality. To deal with this problem, one could count the number of fanouts that would be affected and choose the path with the least fanouts. However, implementing an exact fanout count in hardware could be prohibitively expensive.

A better embodiment allows to approximate the count fanout heuristic in a binary fashion with a fanout lock. The idea is that nets with large fanouts should be locked down after they have been routed, in order to prevent them from being ripped-out. In the scheme above, the cost for victimizing a high fanout net is practically infinite, so a high fanout net should not be a victim candidate. Since nets are ordered by decreasing fanout, high fanout nets will be routed first before they have a chance to interfere with each other. To implement fanout lock in hardware, a lock bit will be added for every switch, to be asserted, after allocation, for a high fanout net.

If a switch has an asserted lock-bit, it will not propagate cost signal upward. This assures the crossover switch box will not select a path with high fanout nets. In the preferred embodiment, nets with more than ten fanouts are locked after allocation.

Figure 18:
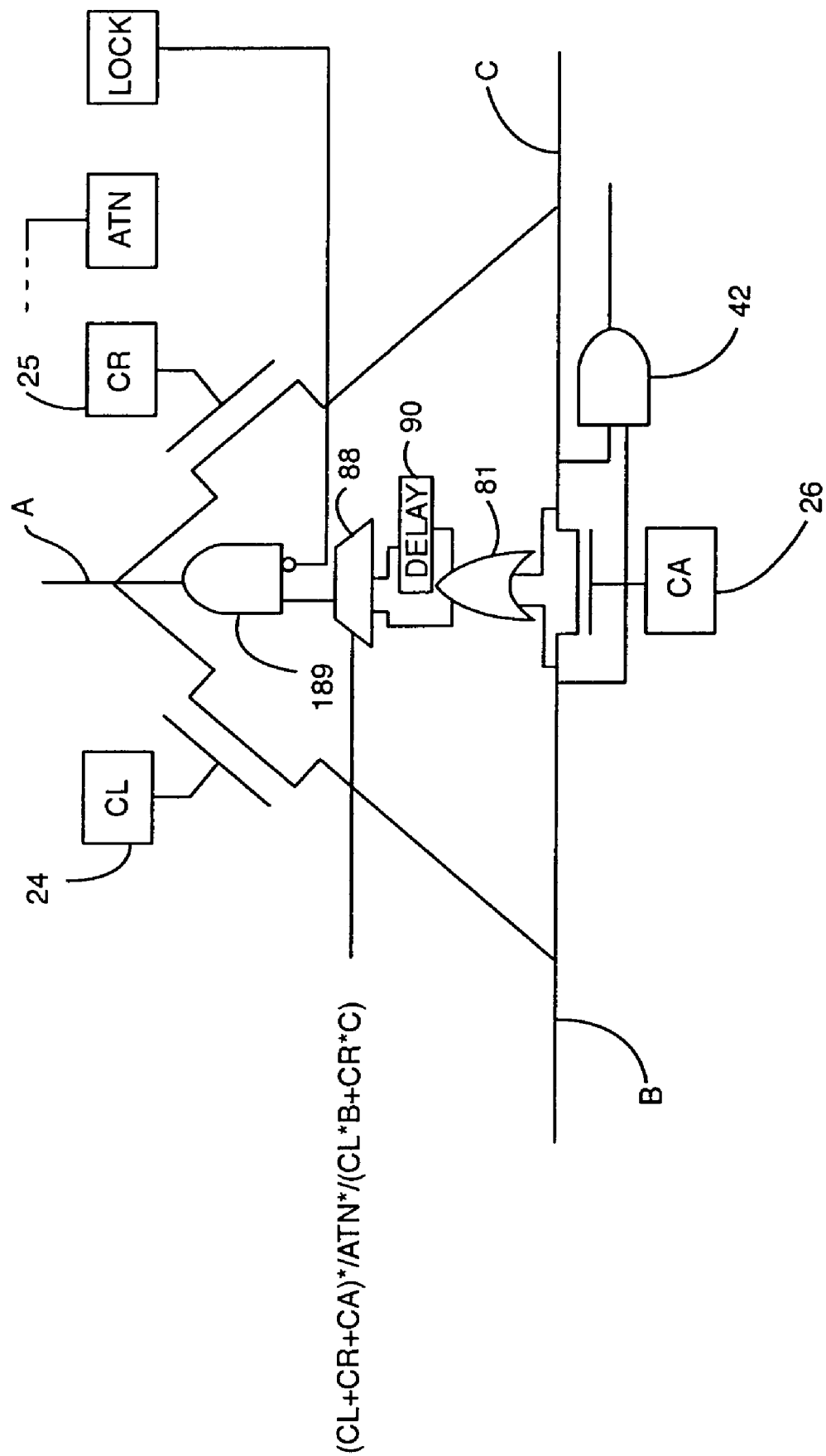
FIG. 18 shows a switch comprising a lock bit.

An example of a switch including a lock bit is shown in FIG. 18, where a lock bit LOCK is shown. If LOCK is set, the additional AND gate 189 prevents the search signal from being passed up to the parent A during a search.

Application to Meshes

The method according to the present invention can also be used with more traditional, mesh-based FPGA routing networks. The following additional challenges will need to be taken into consideration:

There is no well defined crossover point which will contain all possible routes.

It is not obvious which direction through a switchpoint actually leads to the shortest path to the destination.

The path back to the source is not implied directly by the topology of the routing network.

Not all paths from source to sink are the same length and non-minimal length paths may be important components of a good solution.

The more general hardware-search strategy is to start a path search as before, with the source driving a one into its output and all non-sources driving zeros. In this case, we do not drive from the sink. Rather, the sink will 'listen' for the arrival of a one on one of its inputs. The switches are designed to propagate the one driven from the source along any free path in the network without delay and to propagate along congested paths only after inserting an appropriate delay to approximate an appropriate congestion delay. Using this basic scheme, the signal from the least delay path will arrive at the destination first.

In order to find the path back to the source and negotiate among equivalent, alternative paths, "breadcrumbs" can be left to mark the path back from the source to the sink. That is, each switchpoint notes which input arrives first and marks that input as the appropriate direction to route an allocate signal should it subsequently receive one. It is quite possible that two or more search signals arrive at the same switchpoint at the same time. To promote stochastic path selection, the switchpoint is allowed to select randomly among the input signals arriving at the same time. The selected input will be called the preferred input. Here, unlike the tree, the random selection is distributed along the path instead of making a single random selection at the end.

Allocation proceeds analogous to the tree case. We drive a one into the selected input at the sink. This one will follow the stored preferences back to the source, marking the switchpoints which the path touches as allocation choices. As before, if this new path intersects with an existing path, the switches are marked as victims. A victim identification phase allows all victim paths to be identified and dropped from the network. The source records the fact that it was victimized so the route controller will know that it needs to be rerouted. FIGS. 19-24 show an example of operation of the above outlined route search process, where the result of a path search for a route from node (0, 1) to node (2, 1) is shown.

Figure 19:
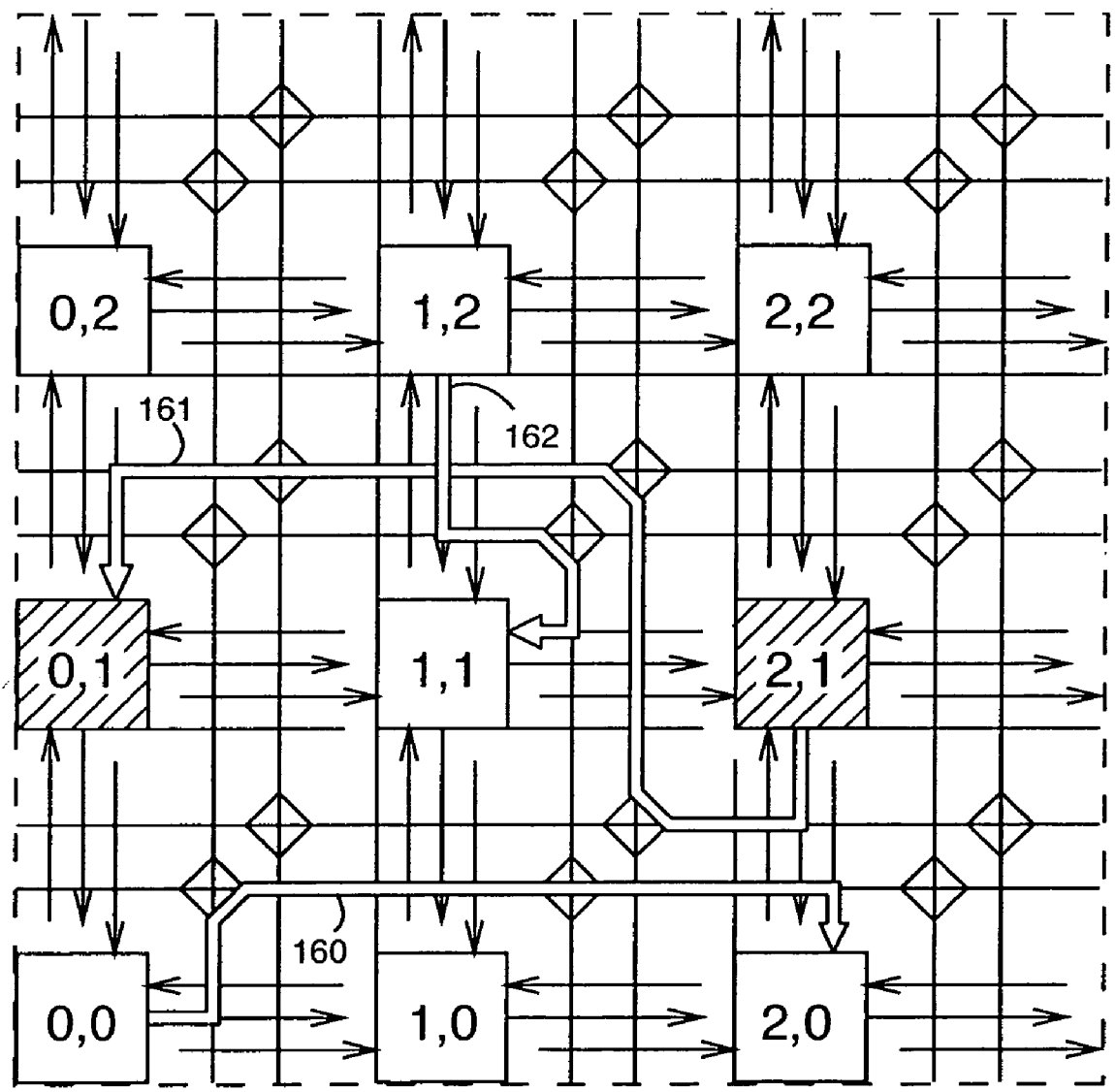
FIGS. 19-24 show an embodiment of a route search process in the application to meshes.

With reference to FIG. 19, the light, thick lines show pre-existing routes. For example, line 160 shows a route from node (0, 0) to node (2, 0); line 161 shows a route from node (0, 1) to node (2, 1); and line 162 shows a route from node (1, 2) to node 1, 1). In the case at issue, the source node will be node (0, 1) and the destination node will be node (2, 1).

Figure 20:
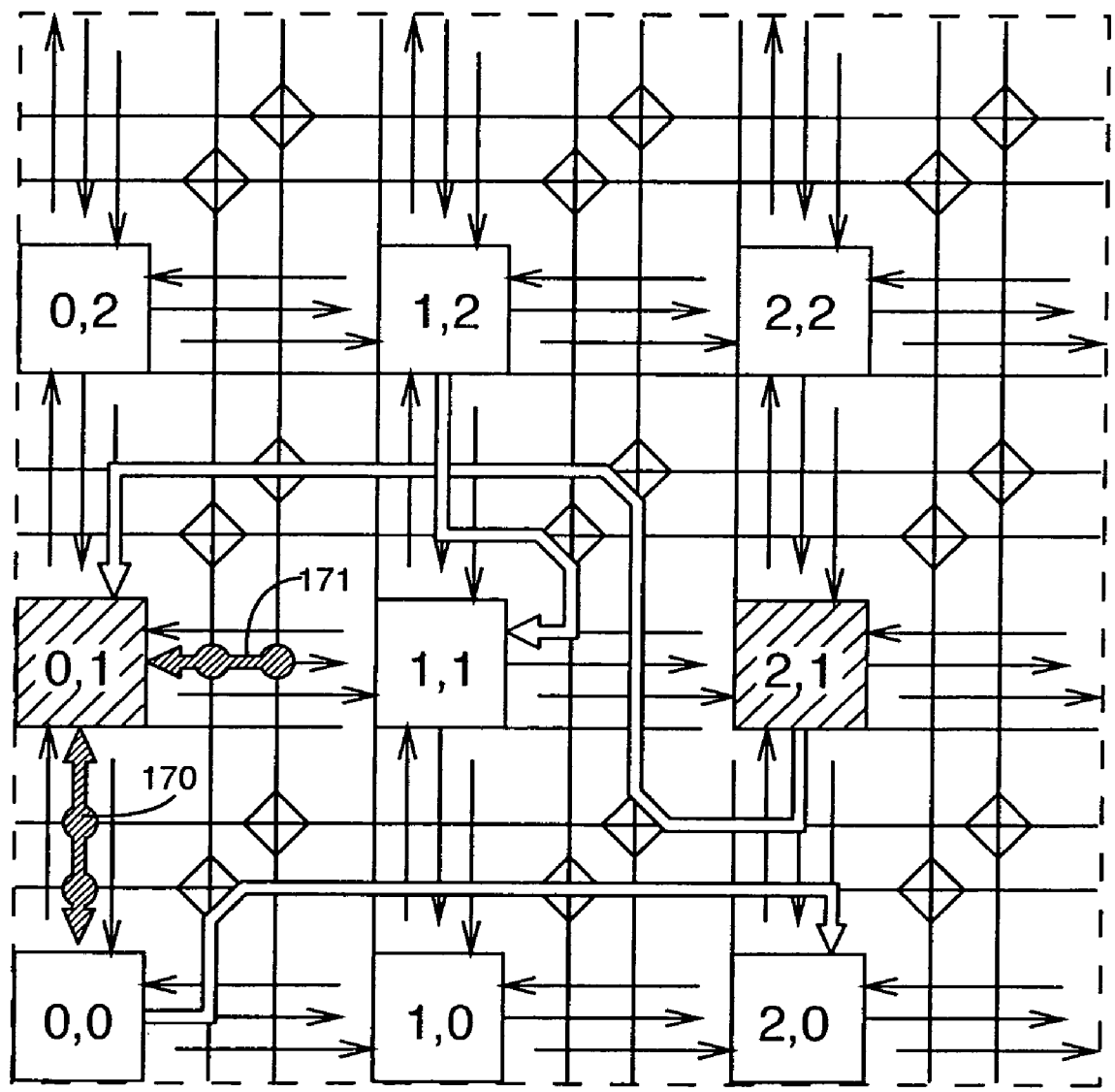

FIG. 20 shows the beginning of a first cycle of the search, where the search signal exits the source (0, 1) into the associated vertical channel 170 and horizontal channel 171.

Figure 21:
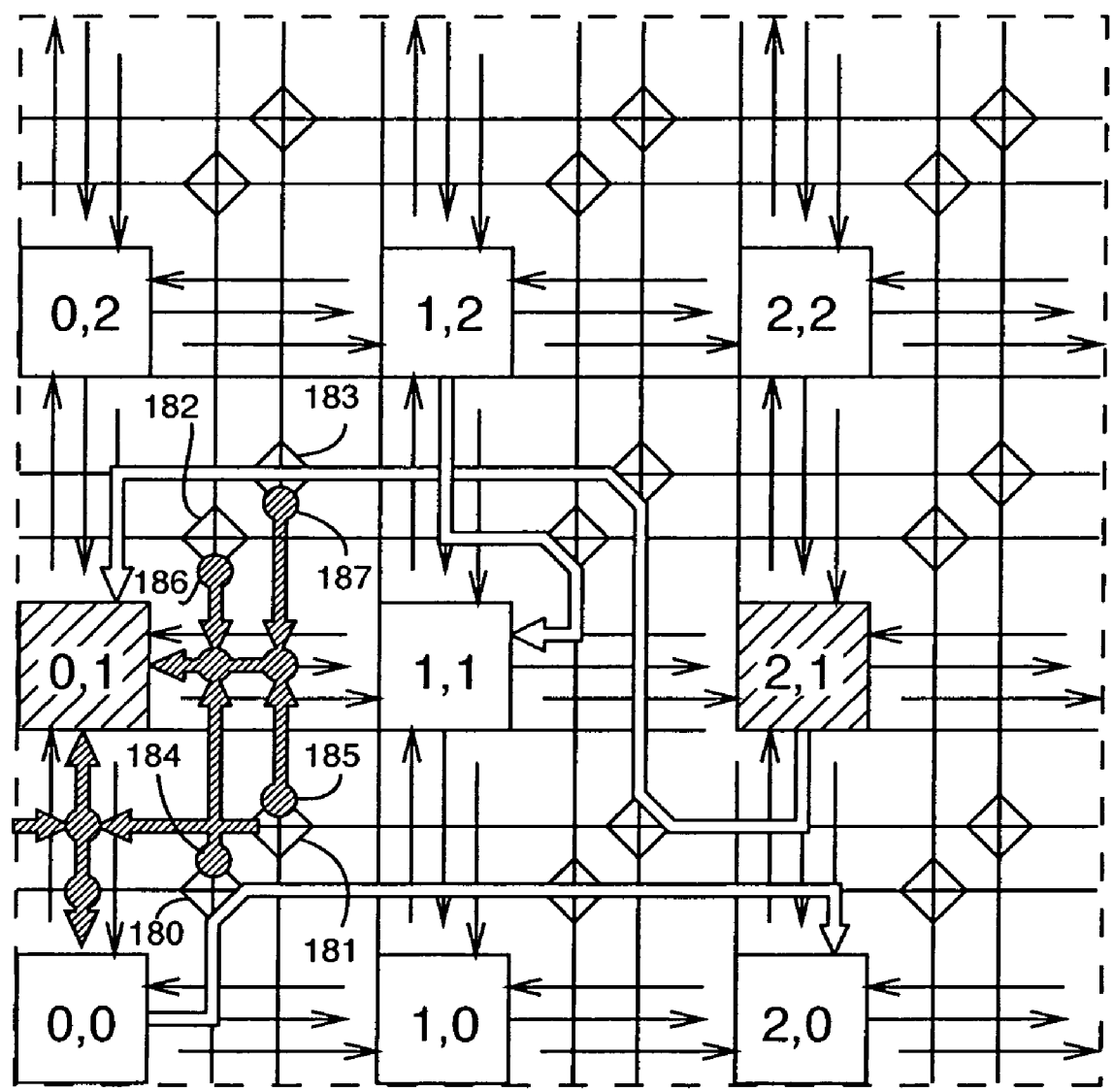

FIG. 21 shows the end of the first cycle, where the signal has reached four switchpoints: switchpoint 180, switchpoint 181, switchpoint 182, switchpoint, 183, and switchpoint 184. It can be noted that switches 180 and 181 are reached simultaneously from two directions. In this case, one of the two directions is selected randomly as the winner. In FIG. 21 the dots 184, 185, 186, and 187 indicate the winning, preferred path, which is trivial in the case of a single path reaching a determined switchpoint. The links are marked with 1, which indicates the timestep when the search signal reaches the annotated signal.

Figure 22:
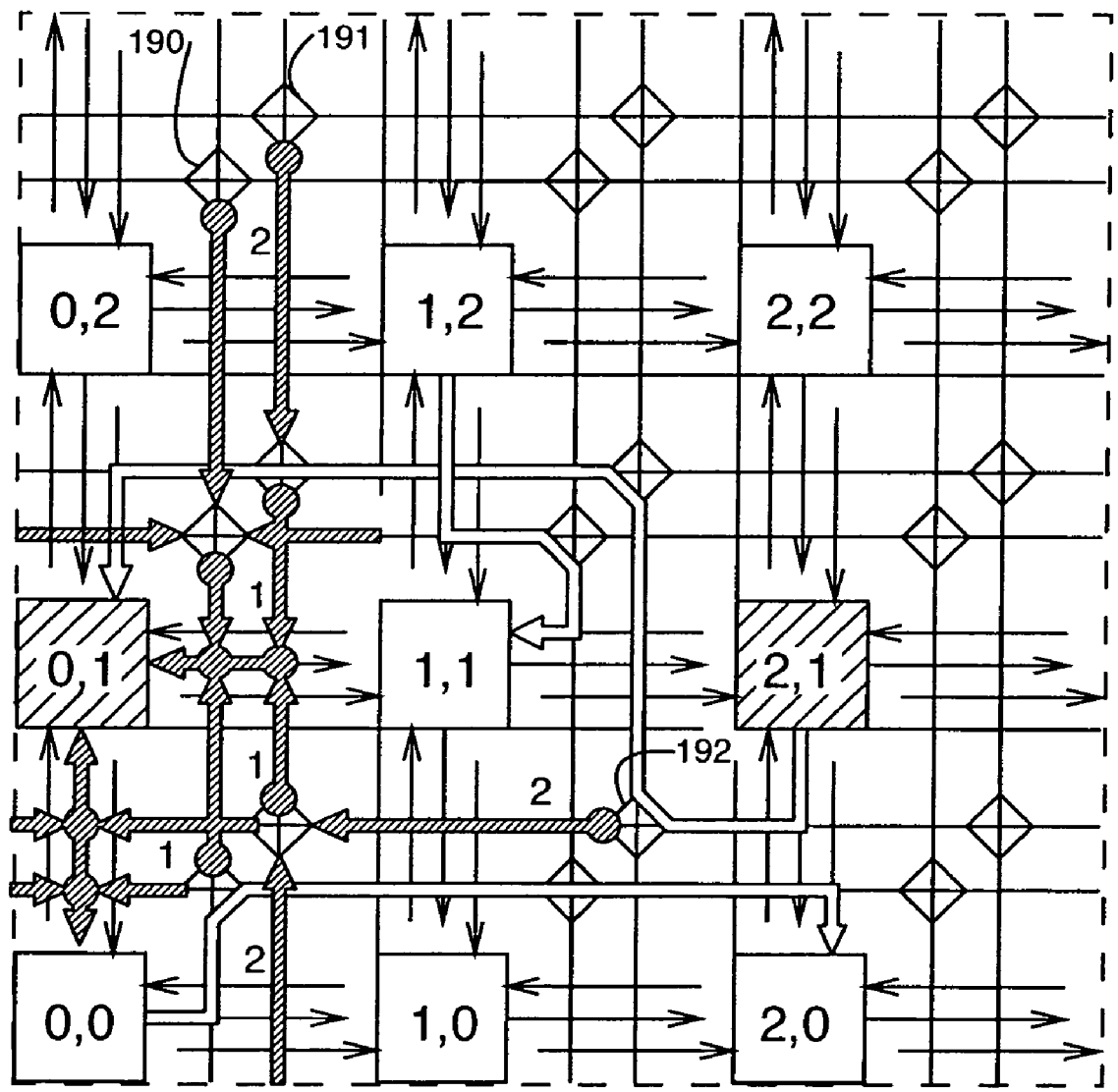

FIG. 22 shows the situation at the end of the second cycle, where the signal has reached switchpoints 190, 191, and 192. The links are marked with 2, because the switchpoints are reached in the second timestep.

Figure 23:
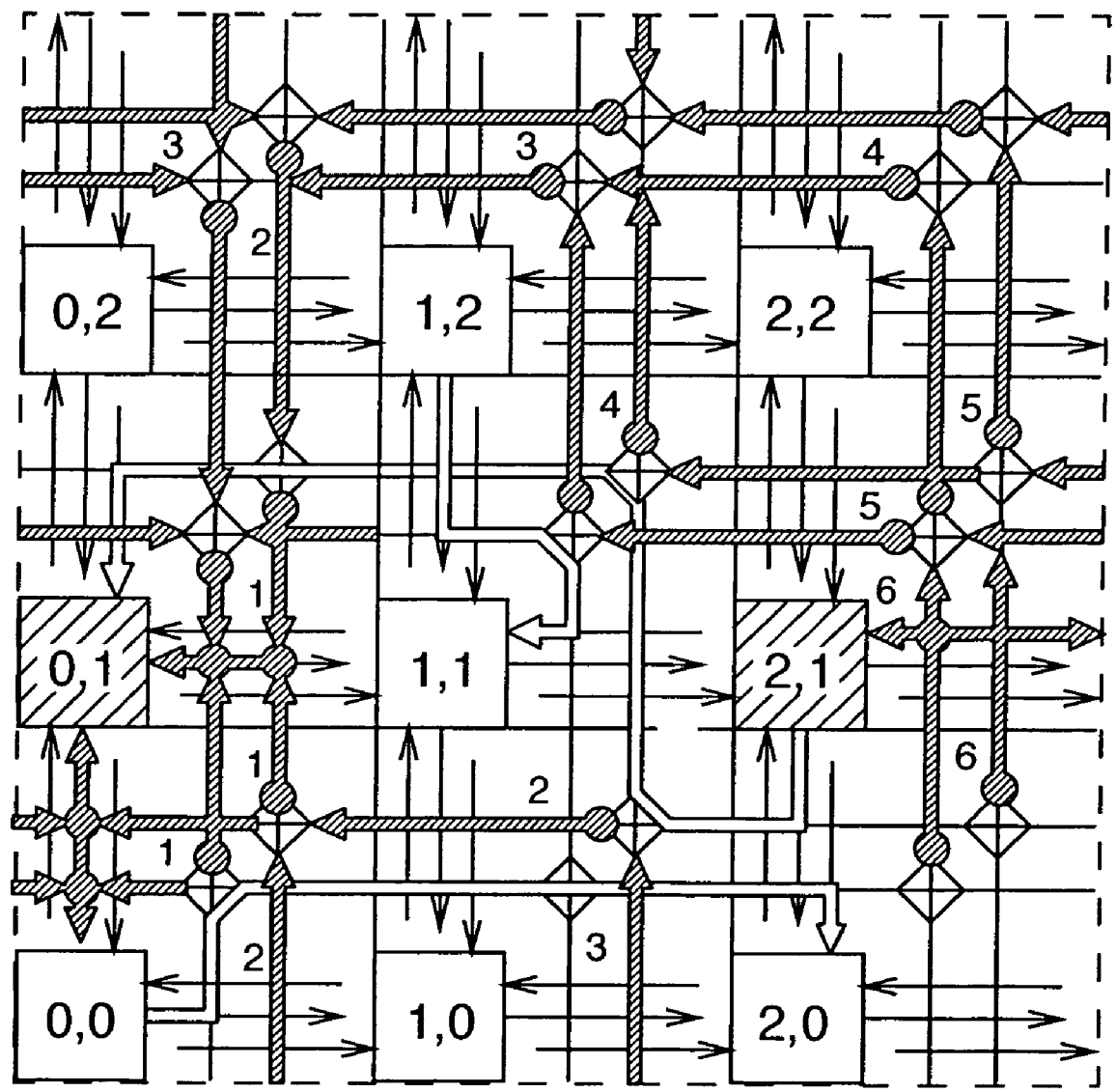

FIG. 23 shows the situation at the end of the sixth cycle, where the destination (2, 1) is reached. Therefore, a path from the node (0, 1) to the node (2, 1) has been established. The destination will now send back an allocation signal along the marked path, using the dots to select a single back path at each switchpoint.

Figure 24:
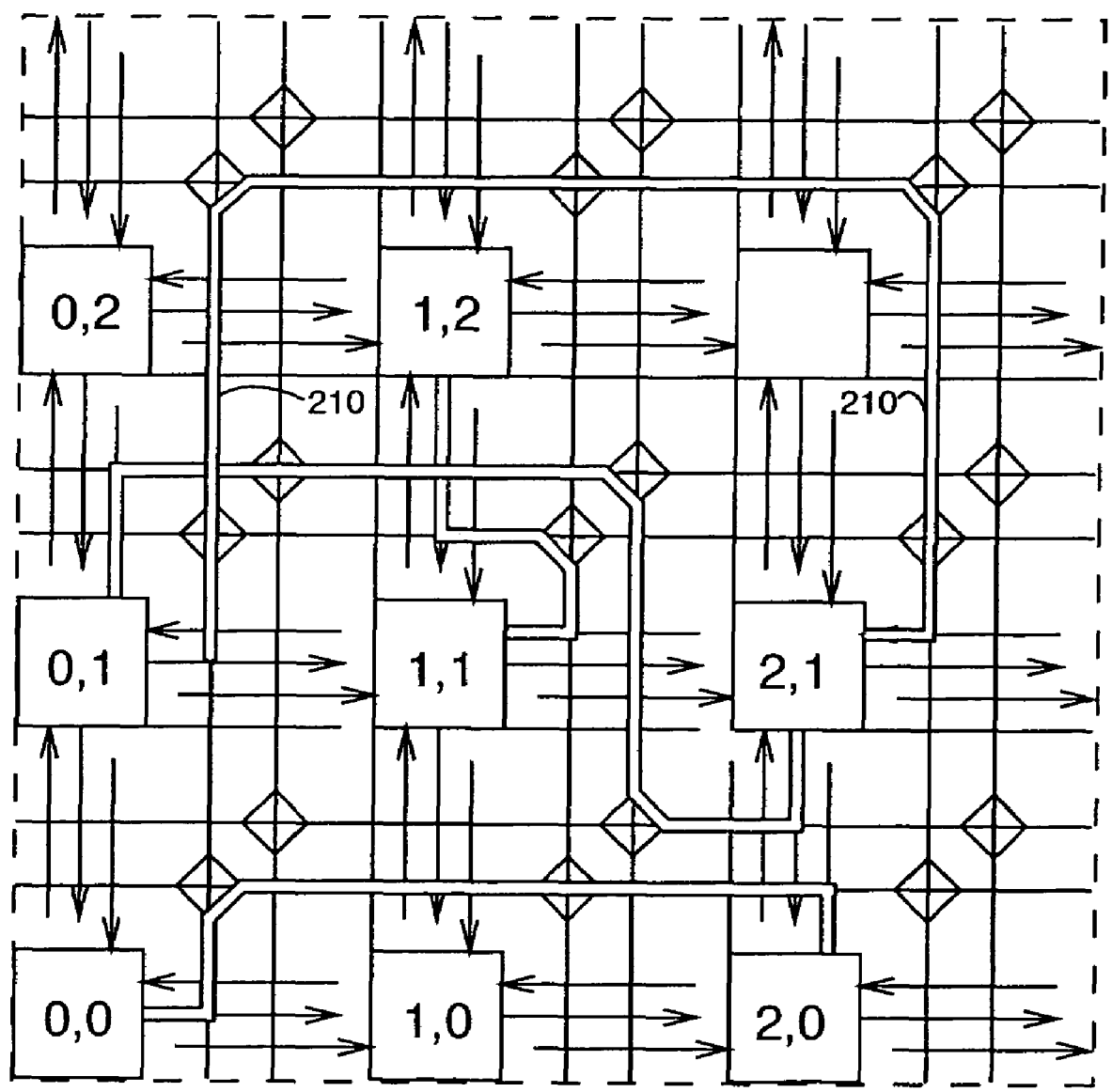

FIG. 24 is similar to FIG. 19, the only difference being that a new path, indicated with 210, is now present.

Application to Meshes With Fanout

To support fanout in the mesh, we route all of the destinations (two-point connections in a net) one at a time in sequence and add additional state to keep track of which switchpoints are allocated by the current net. To attempt to minimize the resources used by each net, we allow path search to flow along paths already allocated to this net. The basic path search for each endpoints is as follows:

1. Drive a one into the source and allow it to propagate along the already allocated path
2. Continue search, allowing the search to proceed outward from the existing path through free paths, but do not allow any signal propagation through congested paths; this has the effect of finding the shortest, congestion-free extension of the existing net, if there is one
3. If that fails, start a fresh search back at the sources, but keep the path preferences from the previous search where appropriate; this new search from the source makes sure that we find the shortest path according to the standard congestion delay metric to the sink. The new path may be routed in a new domain if that is the least cost path. Since we keep the preferences from the previous search, existing paths will always be preferred over new paths when they are the same length; however, if a new path is shorter, which can happen because of victimization, the shorter path is taken. Had we not restarted this victimizing search from the source, we could not guarantee to find the path with the least victimization.

Some variations can be provided to the scheme above:

Atomic victimization→Nets can be removed either atomically or one link at a time; the simplest scheme for non-atomic victimization is to simply victimize the net atomically, then add back all the destinations which can be added without victimizing existing paths; this requires time to clear out a net (drop it) before rerouting it.

Count net transitions→By allowing a path search forward along previously allocated paths without delay, the number of nets which intersect a path can be counted rather than the number of used switches.

Congestion delay→Since the mesh and networks in general may have non-minimal length paths, simply delaying the search signal one cycle is not adequate to distinguish between a congested route and a longer, uncongested route. Consequently, increased congestion delays can be considered to help mitigate the aliasing effects.

Finally, the structure for both of these routers can be mapped into FPGA LUTs so that a large collection of FPGAs can be used to perform the routing of a single FPGA.

FIG. 25 shows the logic equations needed to implement a tree switch that supports the hardware-assisted routing shown in FIGS. 19-24. With reference to FIG. 25, the symbols CL, CR and CA are the configuration bits for the left, right and across transistors. GlobalRoute$_{left}$ and GlobalRoute$_{right}$ are part of the global tree that guides the allocation process. The symbols Allocate, VictimSearch, IdentifyVictim, ClearVictim, Drop, DropBit, Lock, and NewNet are global control signals to help guide the routing process. To implement these equations in LUT would require around 21 LUTs, two of which are added for fanout support. Moreover, we need to consider the additional logic needed at the switch box level such as the random number generator, the parallel prefix circuit, and various control signals between the switch box and the global route controller. It can be conservatively estimated that it would require 9 more LUTs per switch for the switch-box level logic. As a result, it would require 30 LUTs to simulate a fast-routing switch. Conservatively counting a P-switch (two up-links) as two T-switches (one up-link) and assuming p=0.67, it can be shown that the total number of switchpoints in a design will be 5×N_array×C.

With reference to mesh implementation, the core of mesh implementation is the switchpoint logic. FIG. 26 shows a representative set of equations for the diamond switchpoint. The symbol 'uon' designates "Used by Other Nets." The symbol 'ATN' indicates "Allocated for This Net." It can be shown that several hundred LUTs per domain are needed. Since domains are independent, it would likely be beneficial to sequentialize domain search so that we contain the total design to several hundred LUTs per LUT in the original design.

According to the present invention, parallel routing of nets can also be performed. With reference to the HSRA, for example, as long as routes are in disjoint subtrees, route search can be performed in parallel. Managing of parallel routing will be performed through a signal controller. More sophisticated cases can involve a hierarchical set of controllers.

Assuming the controller is a traditional RISC and the full hardware version of the present invention, each route operation will require something like 20 cycles. The use of hierarchical controllers will be important for scaling, avoiding idles on a subtree while initiating routes on other subtrees. For example, a number of controllers at least equal to the number of subtrees can be provided.

While several illustrative embodiments of the invention have been shown and described in the above description, numerous variations and alternative emodiments will occur to those skilled in the art. Such variations and alternative embodiments are contemplated, and can be made without departing from the scope of the invention as defined in the appended claims.

What is claimed is:

1. A network comprising:
    a plurality of endpoints connectable through interconnect links; and
    a plurality of switchpoints to programmably connect one or more of the interconnect links, a path between endpoints being determined by a configuration of switchpoints,
    wherein the switchpoints include propagation circuitry to propagate a search signal in parallel through a plurality of unused paths in the network, to identify the configuration of switchpoints allowing a path between a first endpoint and a second endpoint to be established.

2. The network of claim 1, wherein the switchpoints include switchpoints having at least one parent channel and at least two child channels, the propagation circuitry comprising a first OR gate to send a status signal of the child channels to the at least one parent channel.

3. The network of claim 2, wherein the child channels are connectable to the parent channel and between themselves through up-down switches controlling connection between the parent channel and a child channel and a crossover switch controlling connection between the child channels, the status signal having a status path distinct from a child-parent path connecting the child channels to the parent channels and a child-child path connecting the child channels between themselves.

4. The network of claim 3, wherein the propagation circuitry further comprises enabling circuitry to enable the status signal to be received by the parent channel.

5. The network of claim 4, wherein the enabling circuitry comprises a tristate buffer enabling the status signal to be received by the parent channel during a time period where the up-down switches do not establish a connection between the parent channel and a child channel.

6. The network of claim 5, wherein the status signal is not sent to the parent channel in case the crossover switch establishes a connection between the child channels.

7. The network of claim 1, wherein the switchpoints further comprise delay circuitry, to delay the search signal each time a switchpoint is in use.

8. The network of claim 7, wherein the delay circuitry comprises a delay flip-flop.

9. The network of claim 3, further comprising:
a delay circuit selectively connected to the first OR gate, wherein the status signal is delayed when at least one up-down switch is in use and is not delayed when no up-down switch is in use.

10. The network of claim 3, further comprising:
a delay circuit selectively connected to the first OR gate, wherein the status signal is delayed when at least one among the up-down and crossover switches is in use and is not delayed when the up-down and crossover switches are not in use.

11. The network of claim 10, further comprising
a second OR gate and a multiplexer connected to the second OR gate, wherein the second OR gate is indicative of at least one switch being set among the up-down and crossover switches, the second OR gate controlling propagation or delay of the status signal.

12. The network of claim 3, further comprising:
a delay circuit selectively connected to the first OR gate, wherein the status signal is not delayed when the up-down switches are not in use or the search signal has a direction consistent with a condition of the up-down switches and the status signal is delayed when the search signal has a direction inconsistent with a condition of the up-down switches.

13. The network of claim 1, wherein the switchpoints further comprise identification circuitry to identify the presence of the search signal on two or more child channels.

14. The network of claim 3, wherein the switchpoints comprise allocation circuitry to set the configuration of switchpoints between the first endpoint and the second endpoint once the path between the first endpoint and the second endpoint has been established.

15. The network of claim 14, wherein choice among equivalent paths is made randomly.

16. The network of claim 14, wherein the allocation circuitry comprises:
circuitry acting as a global route binary tree within the network, said circuitry been able to retrieve path-forming switchpoints once the path from the first endpoint to the second endpoint has been established, the path-forming switchpoints including a crossover switchpoint, the crossover switchpoint having at least a crossover switchpoint parent channels and at least two crossover switchpoint child channels, the search signal having been propagated to the crossover switchpoint child channels;
means for deasserting the search signal from the crossover switchpoint child channels;
means for establishing connection of the crossover switchpoint child channels to a voltage source, thus establishing an allocation voltage value on the crossover switchpoint child channels;
means to propagate the allocation voltage value to other path-forming switchpoints; and
means for setting the other path-forming switchpoints once the other path-forming switchpoints have been reached by the propagated allocation voltage value.

17. The network of claim 16, wherein choice among equivalent paths is made randomly.

18. The network of claim 1, wherein the switchpoints comprise deallocation circuitry to clear switchpoints pertaining to an existing configuration of switchpoints once no path between the first endpoint and the second endpoint has been established.

19. A network comprising:
a plurality of endpoints connectable through interconnects; and
a plurality of programmable switchpoints to connect one or more of the interconnects,
wherein the switchpoints and the interconnects act as:
search circuitry during a search phase where a search signal is propagated in parallel through a plurality of free paths in the network to identify a configuration of switchpoints establishing a path between a first endpoint and at least one second endpoint;
allocation circuitry during an allocation phase where the switchpoints of the configuration of switchpoints establishing the path are set;
victimization circuitry during a deallocation phase where set switchpoints are cleared; and
path-establishing circuitry during normal operation of the network.

20. A hardware-assisted method to route a signal between a first endpoint and a second endpoint on a network having connections and switchpoints, comprising:
determining unused network connections; and
driving a search signal into the network along a plurality of the unused network connections to identify a configuration of switchpoints allowing a path between the first endpoint and the second endpoint to be established.

21. The method of claim 20, further comprising:
allocating the established path by setting the configuration of switchpoints.

22. The method of claim 20,
wherein driving a search signal comprises:
driving a first search signal from the first endpoint to a first switchpoint;
driving a second search signal from the second endpoint to a second switchpoint; and
propagating the first and second search signal through the plurality of the unused network connections from the first and second switchpoint to other switchpoints,
wherein the path between the first endpoint and the second endpoint is established once a switchpoint to which both the first search signal and the second search signal have been propagated is determined.

23. The method of claim 20, wherein, when multiple configurations of switchpoints allowing a path between the first and second endpoint to be established are determined, a single configuration is selected.

24. The method of claim 23, wherein the single configuration is selected randomly.

25. The method of claim 24, wherein the single configuration is selected according to a Pseudo-Random Number Generator—Cyclic-Segmented Parallel Prefix (PRNG-CSPP) generation scheme.

26. The method of claim 20, wherein, when no configuration of switchpoints allowing a path between the first and second endpoint to be established are determined, the path is established by using resources from an already existing path.

27. The method of claim 26, wherein the already existing path is the least congested path among existing paths.

28. The method of claim 20, wherein, when no configuration of switchpoints allowing a path between the first and second point to be established are determined, the path is established by victimizing at least one conflicting path to expose an available path.

29. The method of claim 28, wherein the path to be victimized is selected randomly.

30. The method of claim 28, wherein the path to be victimized is the path with least congestion among existing paths.

31. The method of claim 28, wherein the path to be victimized is selected randomly from among the paths with least congestion among existing paths.

32. The method of claim 28 wherein victimizing is performed by hardware.

33. The method of claim 28 wherein victimizing is performed by software.

34. A network comprising:
a plurality of endpoints connectable through interconnects; and
a plurality of switching elements to programmably connect one or more of the interconnects, a path between endpoints being determined by a configuration of switching elements,
wherein the switching elements comprise propagation hardware to propagate a search signal in parallel through a plurality of available paths in the network, in order to identify a configuration of switching elements allowing a path between one endpoint and a plurality of other endpoints to be established.

35. The network of claim 34, wherein each switching element comprises a state bit to be set during a current net search.

36. A method for searching a path, in a network having a plurality of switchpoints, between a source and a plurality of destinations, the method comprising, for each destination:
propagating a search signal from the destination along a plurality of unused network connections in parallel to identify path-establishing switchpoints establishing a path between the source and the destination; and
allocating the established path by setting the path-establishing switchpoints.

37. The method of claim 36, further comprising:
ordering each destination according to a length of a path between the source and that destination before propagating a search signal.

38. A method for establishing a route between a source and at least a destination on a programmable routing network having a plurality of switchpoints, comprising:

in a first time step, starting a route search by driving a search signal from the source along a plurality of unused network connections originating from the source;
upon reaching of a switchpoint, in a second time step, propagating the search signal along a plurality of unused network connections originating from the switchpoint;
in case the search signal reaches the switchpoint from more than one direction, determining a preferred direction of propagation of the search signal originating from the switchpoint; and
terminating the route search when the search signal reaches the at least one destination.

39. The method of claim 38, further comprising keeping track of a number of time steps used to reach any switchpoint.

40. The method of claim 38, wherein an allocation signal is sent along a preferred route determined during the route search.

41. A method for establishing a route between a source and at least one destination on a programmable routing network having a plurality of switchpoints, comprising:
starting a route search by driving a search signal from the source to one or more first switchpoints;
propagating the search signal in parallel along a plurality of paths from the one or more first switchpoints to other switchpoints; and
terminating the route search when the signal reaches the at least one destination.

42. The method of claim 41, wherein the search signal is driven along multiple directions, and wherein a preferred direction is chosen each time a switchpoint is reached from multiple directions.

43. A network comprising:
a plurality of endpoints connectable through interconnect links; and
a plurality of switchpoints to programmably connect one or more of the interconnect links, a path between endpoints being determined by a configuration of switchpoints,
wherein the switchpoints include propagation circuitry to propagate a search signal through the network, to identify the configuration of switchpoints allowing a path between a first endpoint and a second endpoint to be established,
wherein the switchpoints include switchpoints having at least one parent channel and at least two child channels, the propagation circuitry comprising a first OR gate to send a status signal of the child channels to the at least one parent channel,
wherein the child channels are connectable to the parent channel and between themselves through up-down switches controlling connection between the parent channel and a child channel and a crossover switch controlling connection between the child channels, the status signal having a status path distinct from a child-parent path connecting the child channels to the parent channels and a child-child path connecting the child channels between themselves,
wherein the propagation circuitry further comprises enabling circuitry to enable the status signal to be received by the parent channel,
wherein the enabling circuitry comprises a tristate buffer enabling the status signal to be received by the parent channel during a time period where the up-down switches do not establish a connection between the parent channel and a child channel.

44. The network of claim 43, wherein the status signal is not sent to the parent channel in case the crossover switch establishes a connection between the child channels.

45. A network comprising:
a plurality of endpoints connectable through interconnect links; and
a plurality of switchpoints to programmably connect one or more of the interconnect links, a path between endpoints being determined by a configuration of switchpoints, wherein the switchpoints include propagation circuitry to propagate a search signal through the network, to identify the configuration of switchpoints allowing a path between a first endpoint and a second endpoint to be established, wherein the switchpoints include switchpoints having at least one parent channel and at least two child channels, the propagation circuitry comprising a first OR gate to send a status signal of the child channels to the at least one parent channel,
wherein the child channels are connectable to the parent channel and between themselves through up-down switches controlling connection between the parent channel and a child channel and a crossover switch controlling connection between the child channels, the status signal having a status path distinct from a child-parent path connecting the child channels to the parent channels and a child-child path connecting the child channels between themselves,
a delay circuit selectively connected to the first OR gate, wherein the status signal is delayed when at least one among the up-down and crossover switches is in use and is not delayed when the up-down and crossover switches are not in use; and
a second OR gate and a multiplexer connected to the second OR gate, wherein the second OR gate is indicative of at least one switch being set among the up-down and crossover switches, the second OR gate controlling propagation or delay of the status signal.

46. A network comprising:
a plurality of endpoints connectable through interconnect links; and
a plurality of switchpoints to programmably connect one or more of the interconnect links, a path between endpoints being determined by a configuration of switchpoints, wherein the switchpoints include propagation circuitry to propagate a search signal through the network, to identify the configuration of switchpoints allowing a path between a first endpoint and a second endpoint to be established, wherein the switchpoints include switchpoints having at least one parent channel and at least two child channels, the propagation circuitry comprising a first OR gate to send a status signal of the child channels to the at least one parent channel,
wherein the child channels are connectable to the parent channel and between themselves through up-down switches controlling connection between the parent channel and a child channel and a crossover switch controlling connection between the child channels, the status signal having a status path distinct from a child-parent path connecting the child channels to the parent channels and a child-child path connecting the child channels between themselves,
a delay circuit selectively connected to the first OR gate, wherein the status signal is not delayed when the up-down switches are not in use or the search signal has a direction consistent with a condition of the up-down switches and the status signal is delayed when the search signal has a direction inconsistent with a condition of the up-down switches.

47. A network comprising:
a plurality of endpoints connectable through interconnect links; and
a plurality of switchpoints to programmably connect one or more of the interconnect links, a path between endpoints being determined by a configuration of switchpoints, wherein the switchpoints include propagation circuitry to propagate a search signal through the network, to identify the configuration of switchpoints allowing a path between a first endpoint and a second endpoint to be established, wherein the switchpoints include switchpoints having at least one parent channel and at least two child channels, the propagation circuitry comprising a first OR gate to send a status signal of the child channels to the at least one parent channel,
wherein the child channels are connectable to the parent channel and between themselves through up-down switches controlling connection between the parent channel and a child channel and a crossover switch controlling connection between the child channels, the status signal having a status path distinct from a child-parent path connecting the child channels to the parent channels and a child-child path connecting the child channels between themselves, wherein the switchpoints comprise allocation circuitry to set the configuration of switchpoints between the first endpoint and the second endpoint once the path between the first endpoint and the second endpoint has been established, wherein choice among equivalent paths is made randomly.

48. A network comprising:
a plurality of endpoints connectable through interconnect links; and
a plurality of switchpoints to programmably connect one or more of the interconnect links, a path between endpoints being determined by a configuration of switchpoints, wherein the switchpoints include propagation circuitry to propagate a search signal through the network, to identify the configuration of switchpoints allowing a path between a first endpoint and a second endpoint to be established, wherein the switchpoints include switchpoints having at least one parent channel and at least two child channels, the propagation circuitry comprising a first OR gate to send a status signal of the child channels to the at least one parent channel,
wherein the child channels are connectable to the parent channel and between themselves through up-down switches controlling connection between the parent channel and a child channel and a crossover switch controlling connection between the child channels, the status signal having a status path distinct from a child-parent path connecting the child channels to the parent channels and a child-child path connecting the child channels between themselves, wherein the switchpoints comprise allocation circuitry to set the configuration of switchpoints between the first endpoint and the second endpoint once the path between the first endpoint and the second endpoint has been established, wherein the allocation circuitry comprises:
  circuitry acting as a global route binary tree within the network, said circuitry been able to retrieve path-forming switchpoints once the path from the first endpoint to the second endpoint has been established, the path-forming switchpoints including a crossover switchpoint, the crossover switchpoint having at least a crossover switchpoint parent channels and at least two crossover switchpoint child channels, the search signal having been propagated to the crossover switchpoint child channels;
  means for deasserting the search signal from the crossover switchpoint child channels;
  means for establishing connection of the crossover switchpoint child channels to a voltage source, thus establishing an allocation voltage value on the crossover switchpoint child channels;
  means to propagate the allocation voltage value to other path-forming switchpoints; and
  means for setting the other path-forming switchpoints once the other path-forming switchpoints have been reached by the propagated allocation voltage value.

49. The network of claim 48, wherein choice among equivalent paths is made randomly.

50. A hardware-assisted method to route a signal between a first endpoint and a second endpoint on a network having connections and switchpoints, comprising:
  determining unused network connections; and
  driving a search signal into the network to identify a configuration of switchpoints allowing a path between the first endpoint and the second endpoint to be established,
wherein driving a search signal comprises:
  driving a first search signal from the first endpoint to a first switchpoint; driving a second search signal from the second endpoint to a second switchpoint; and
  propagating the first and second search signal from the first and second switchpoint to other switchpoints,
  wherein the path between the first endpoint and the second endpoint is established once a switchpoint to which both the first search signal and the second search signal have been propagated is determined.

51. A hardware-assisted method to route a signal between a first endpoint and a second endpoint on a network having connections and switchpoints, comprising:
  determining unused network connections; and
  driving a search signal into the network to identify a configuration of switchpoints allowing a path between the first endpoint and the second endpoint to be established, wherein, when no configuration of switchpoints allowing a path between the first and second point to be established are determined, the path is established by victimizing at least one conflicting path to expose an available path, wherein the path to be victimized is selected randomly.

52. A hardware-assisted method to route a signal between a first endpoint and a second endpoint on a network having connections and switchpoints, comprising:
  determining unused network connections; and
  driving a search signal into the network to identify a configuration of switchpoints allowing a path between the first endpoint and the second endpoint to be established, wherein, when no configuration of switchpoints allowing a path between the first and second point to be established are determined, the path is established by victimizing at least one conflicting path to expose an available path, wherein the path to be victimized is selected randomly from among the paths with least congestion among existing paths.

53. A method for searching a path, in a network having a plurality of switchpoints, between a source and a plurality of destinations, the method comprising, for each destination:
  propagating a search signal from the destination along unused network connections to identify path-establishing switchpoints establishing a path between the source and the destination;
  allocating the established path by setting the path-establishing switchpoints; and ordering each destination according to a length of a path between the source and that destination before propagating a search signal.

* * * * *